United States Patent
Kwak et al.

(10) Patent No.: US 11,994,914 B2
(45) Date of Patent: *May 28, 2024

(54) ELECTRONIC DEVICE INCLUDING FRICTION REDUCING STRUCTURE

(71) Applicant: SAMSUNG ELECTRONICS CO., LTD., Suwon-si (KR)

(72) Inventors: Myunghoon Kwak, Suwon-si (KR); Moonchul Shin, Suwon-si (KR); Seungjoon Lee, Suwon-si (KR); Yangwook Kim, Suwon-si (KR); Byounguk Yoon, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,678

(22) Filed: Dec. 28, 2022

(65) Prior Publication Data

US 2023/0161382 A1 May 25, 2023

Related U.S. Application Data

(63) Continuation of application No. 17/377,940, filed on Jul. 16, 2021, now Pat. No. 11,543,859.

(30) Foreign Application Priority Data

Oct. 12, 2020 (KR) .................. 10-2020-0131417
Nov. 9, 2020 (KR) .................. 10-2020-0148475

(51) Int. Cl.
*G06F 3/041* (2006.01)
*G06F 1/16* (2006.01)

(52) U.S. Cl.
CPC .......... *G06F 1/1652* (2013.01); *G06F 1/1686* (2013.01)

(58) Field of Classification Search
CPC ...... G09F 9/301; G06F 1/1641; G06F 1/1652; G06F 2203/04102; H04M 1/0237
See application file for complete search history.

(56) References Cited

U.S. PATENT DOCUMENTS

| 4,948,208 A | 8/1990 | Schubert |
| 10,321,583 B2 | 6/2019 | Seo |

(Continued)

FOREIGN PATENT DOCUMENTS

| CN | 111508372 A | 8/2020 |
| JP | 06-056370 | 3/1994 |

(Continued)

OTHER PUBLICATIONS

U.S. Appl. No. 17/377,940, filed Jul. 16, 2021; Kwak et al.

(Continued)

*Primary Examiner* — Joe H Cheng
(74) *Attorney, Agent, or Firm* — Nixon & Vanderhye P.C.

(57) ABSTRACT

According to various embodiments, an electronic device may include: a housing including an inner space; a slide structure including a reciprocating slide configured to be slidable from the housing by a predetermined reciprocating distance along a first direction; a flexible display at least partially supported by the slide structure and configured to be received in the inner space to be at least partially invisible from the outside in a slide-in state of the electronic device; and a first friction reducing structure disposed between the housing and the slide structure. The first friction reducing structure may include: a guide slit disposed in the housing in a direction parallel to the first direction and having a predetermined length; a guide protrusion configured to be guided by the guide slit in the slide structure; at least one first magnet disposed on the guide slit; and at least one second magnet disposed on the guide protrusion at a position affected by the magnetic force of the first magnet. The at (Continued)

least one first magnet and the at least one second magnet may be arranged to have identical polarities at least partially facing each other along a second direction perpendicular to the first direction.

20 Claims, 31 Drawing Sheets

(56) References Cited

U.S. PATENT DOCUMENTS

| 11,212,379 | B2 | 12/2021 | Baek |
| 11,543,859 | B2 | 1/2023 | Kwak et al. |
| 2008/0119250 | A1 | 5/2008 | Cho et al. |
| 2008/0139261 | A1 | 6/2008 | Cho et al. |
| 2008/0174392 | A1 | 7/2008 | Cho |
| 2008/0182634 | A1 | 7/2008 | Cho et al. |
| 2010/0182738 | A1 | 7/2010 | Visser et al. |
| 2012/0314400 | A1 | 12/2012 | Bohn |
| 2014/0380186 | A1 | 12/2014 | Kim |
| 2016/0081204 | A1 | 3/2016 | Park et al. |
| 2017/0212607 | A1 | 7/2017 | Yoon |
| 2017/0364119 | A1 | 12/2017 | Lee |
| 2019/0268455 | A1 | 8/2019 | Baek et al. |

FOREIGN PATENT DOCUMENTS

| KR | 10-0652734 | 11/2006 |
| KR | 10-0698250 | 3/2007 |
| KR | 10-2007-0115030 | 12/2007 |
| KR | 10-2008-0057481 A | 6/2008 |
| KR | 10-2008-0070434 A | 7/2008 |
| KR | 10-2010-0056862 A | 5/2010 |
| KR | 10-1181385 | 9/2012 |
| KR | 10-1427275 | 7/2014 |
| KR | 10-2016-0031363 A | 3/2016 |
| KR | 10-2017-0089664 | 8/2017 |
| WO | WO-2022085933 | 4/2022 |

OTHER PUBLICATIONS

International Search Report and Written Opinion dated Oct. 20, 2021 in corresponding International Application No. PCT/KR2021/009024.

Extended European Search Report dated Sep. 6, 2023 for EP Application No. 21880281.7.

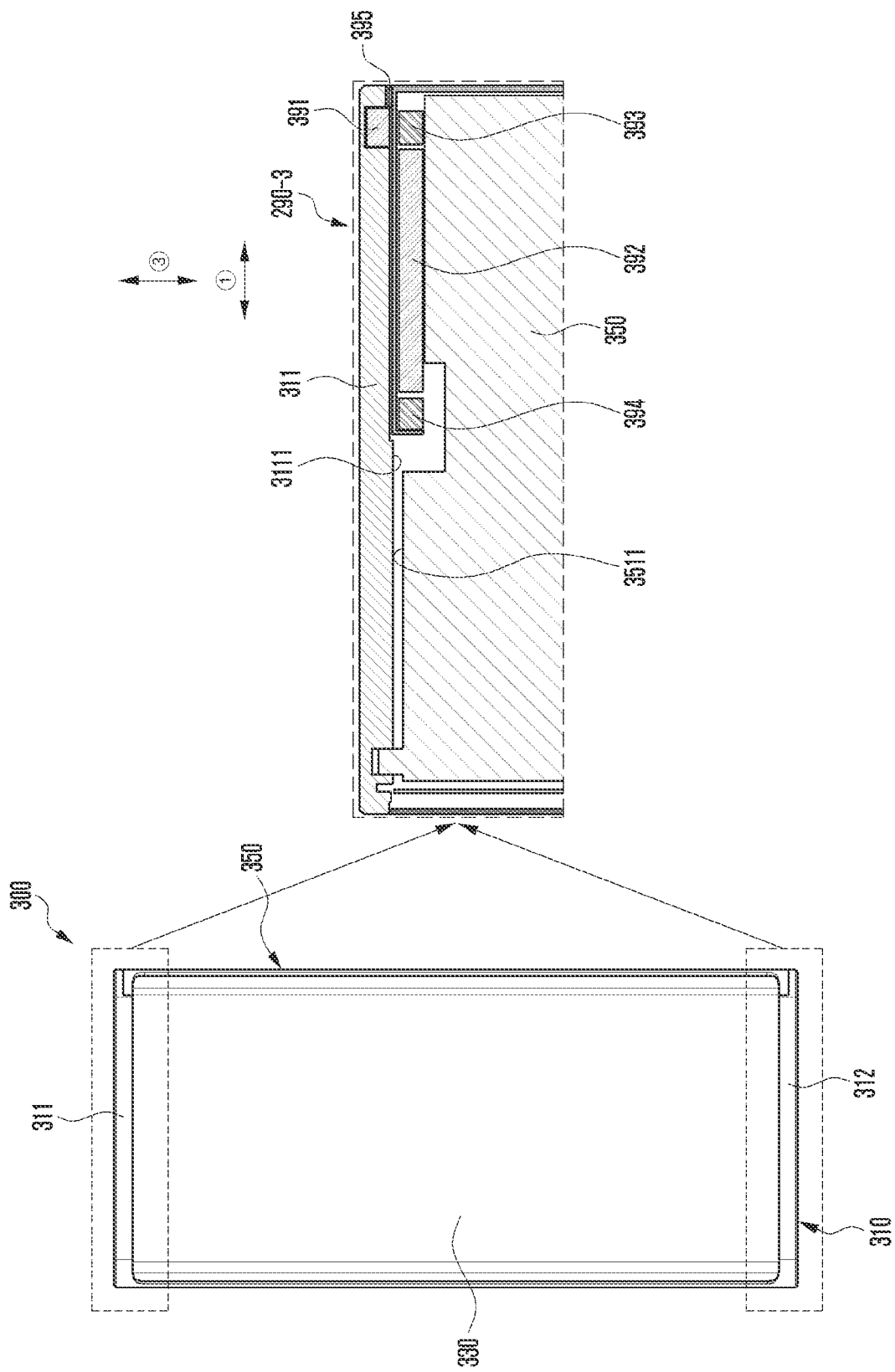

US 11,994,914 B2

ELECTRONIC DEVICE INCLUDING FRICTION REDUCING STRUCTURE

CROSS-REFERENCE TO RELATED APPLICATIONS

This application is a Continuation of U.S. application Ser. No. 17/377,940, filed Jul. 16, 2021 (U.S. Pat. No. 11,543,859), which claims priority to KR 10-2020-0131417, filed Oct. 12, 2020 and KR 10-2020-0148475, filed Nov. 9, 2020, the entire contents of which are all hereby incorporated herein by reference in their entireties.

BACKGROUND

Field

The disclosure relates to an electronic device including a friction reducing structure.

Description of Related Art

Electronic devices are gradually becoming slim, and have been improved to increase the rigidity, to enhance design aspects, and to differentiate functional elements thereof. Electronic devices are gradually changing from existing rectangular shapes to more diversified shapes. An electronic device may have a deformable structure such that, to be carried conveniently, a large-screen display can be used. As an example of the deformable structure, an electronic device may have a housing coupling structure which operates in a sliding type, and a structure (for example, a rollable structure), the display area of which is increased by a flexible display supported thereby. Such an electronic device may be required to have a structure capable of minimizing interference between housings that operate while rotating with regard to each other.

An electronic device may include a deformable slidable electronic device (for example, a rollable electronic device), the display area of which can be increased during use. The slidable electronic device may include a housing (for example, a first housing, a base housing, or a base bracket) and a slide structure (for example, a second housing, a slide housing, or a slide bracket), which may be coupled to be able to move with regard to each other in an at least partially fitted-together type. For example, the slide structure may slide-in or slide-out in a designated direction and by a designated reciprocating distance, thereby varying the display area of the flexible display. The slide structure may be coupled so as to support at least a part of the flexible display (or expandable display) and to operate in an at least partially sliding type from the housing. In addition, the slide structure may be manually slid-in or slid-out by the user, or may automatically switch to a slide-in state or a slide-out state by means of an internal driving mechanism, thereby inducing variation of the display area.

The slidable electronic device may have a guide structure coupled such that the slide structure makes reciprocating movements by a designated distance from the housing. The guide structure may at least partially entail surface friction (for example, friction resistance) between the housing and the slide structure, and such surface friction may result in slide feeling degradation and/or wear, and may even cause an operation failure. In order to address such problems, the guide structure may have an additional physical structure (for example, a bearing or a lubricant) for reducing the frictional force, but such a physical structure may gradually lose the friction reducing effect over time, and the above problem may recur. There may also occur a problem in that the bendable flexible display, when moving to the inner space of the housing, may be lifted by the restoring force that tends to unfold the same.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device including a friction reducing structure.

Embodiments of the disclosure provide an electronic device including a friction reducing structure, the operational reliability of which can be improved even after a long period of use.

Embodiments of the disclosure provide an electronic device including a structure capable of preventing and/or reducing a flexible display from making an undesirable movement during a slide-in/slide-out operation.

According to various example embodiments, an electronic device may include: a housing including an inner space; a slide structure including a reciprocating slide coupled to the housing and configured to be slidable from the housing by a predetermined reciprocating distance along a first direction; a flexible display disposed to be at least partially supported by the slide structure and received in the inner space to be at least partially invisible from the outside in a slide-in state; and a first friction reducing structure disposed between the housing and the slide structure, wherein the first friction reducing structure includes: a guide slit disposed in a direction parallel to the first direction and having a predetermined length in the housing; a guide protrusion arranged to be guided by the guide slit in the slide structure; at least one first magnet disposed on the guide slit; and at least one second magnet disposed at a position affected by a magnetic force of the first magnet, on the guide protrusion, wherein the at least one first magnet and the at least one second magnet are arranged to have identical polarities facing each other, at least partially, along a second direction perpendicular to the first direction.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 13A is a diagram illustrating an example electronic device including a friction reducing structure according to various embodiments;

DETAILED DESCRIPTION

Figure 1:
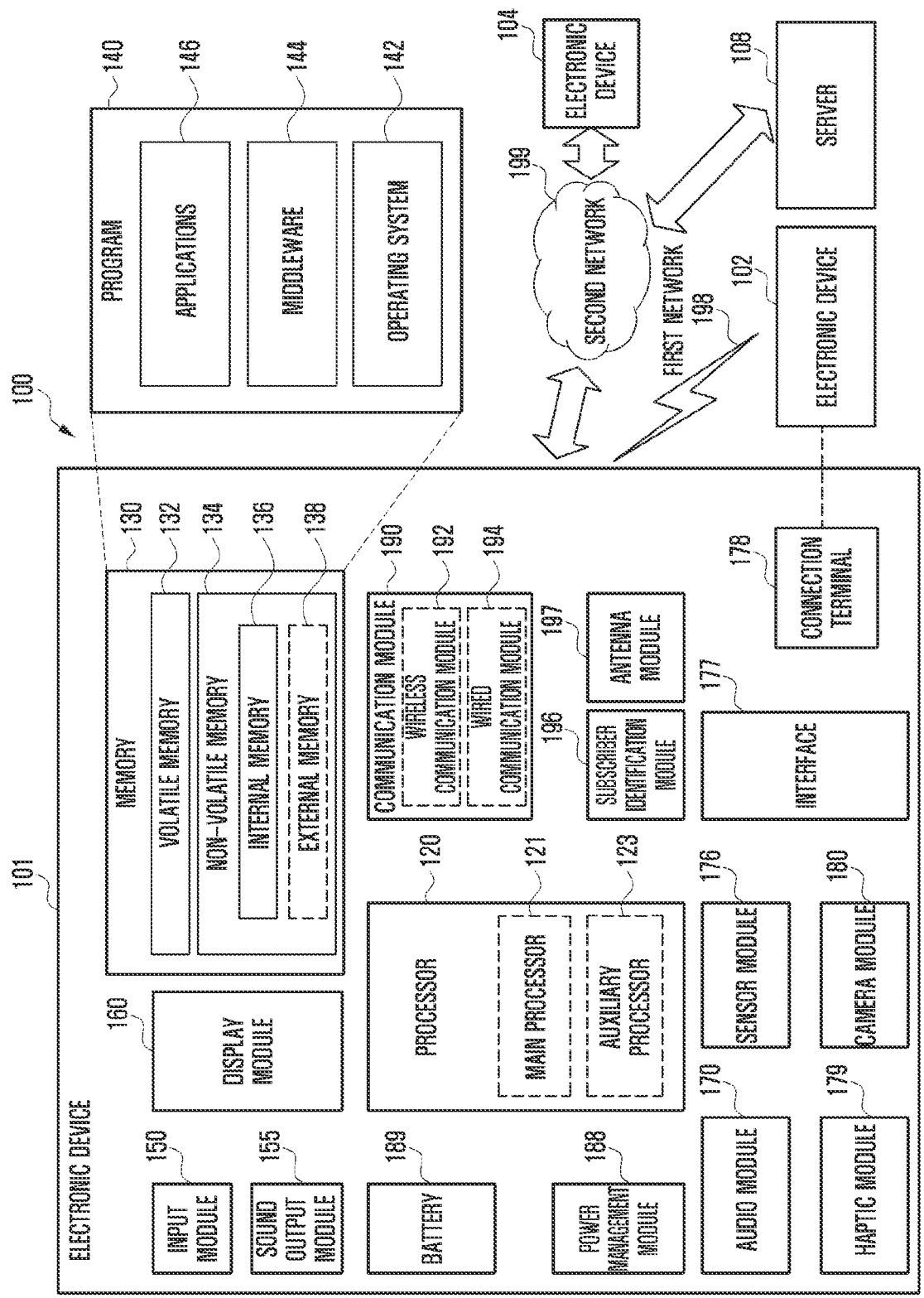
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
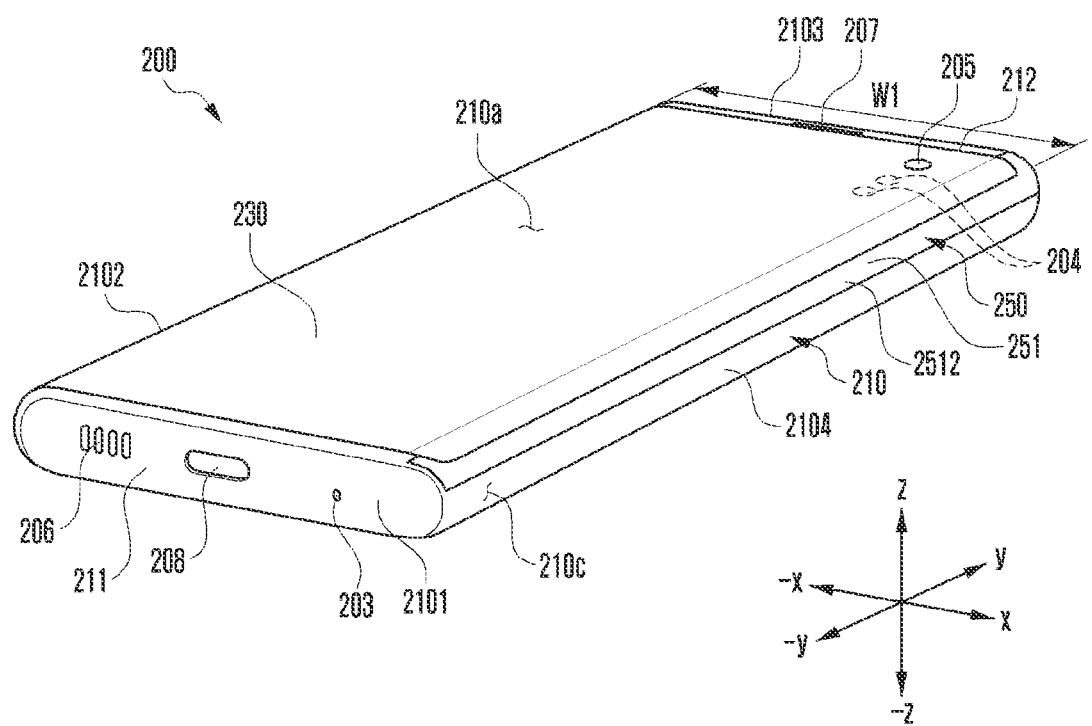
FIG. 2A is a front perspective view of an electronic device, illustrating an example slide-in state according to various embodiments.
Figure 2B:
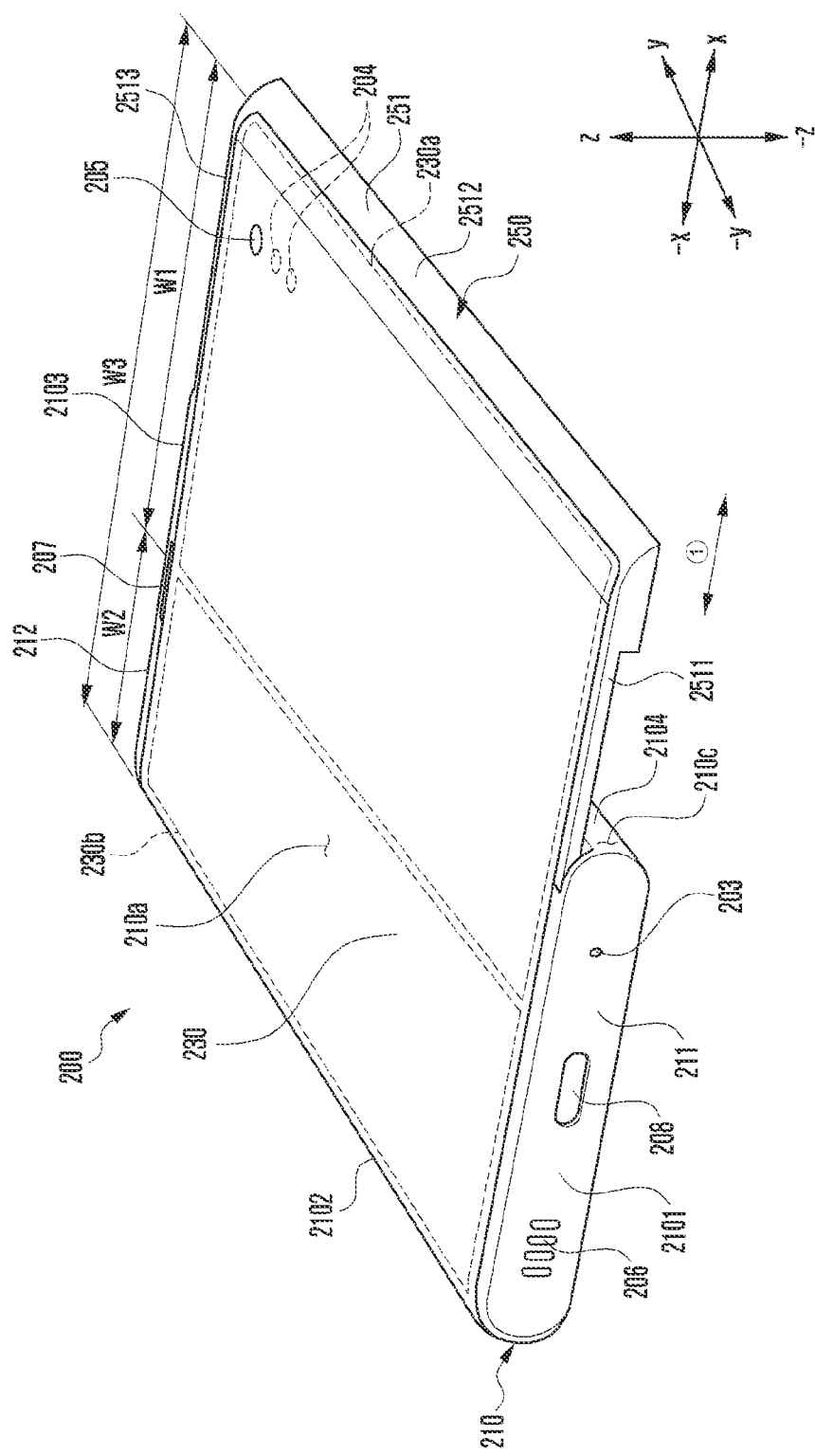
FIG. 2B is a front perspective view of an electronic device, illustrating an example slide-out state according to various embodiments.
Figure 3A:
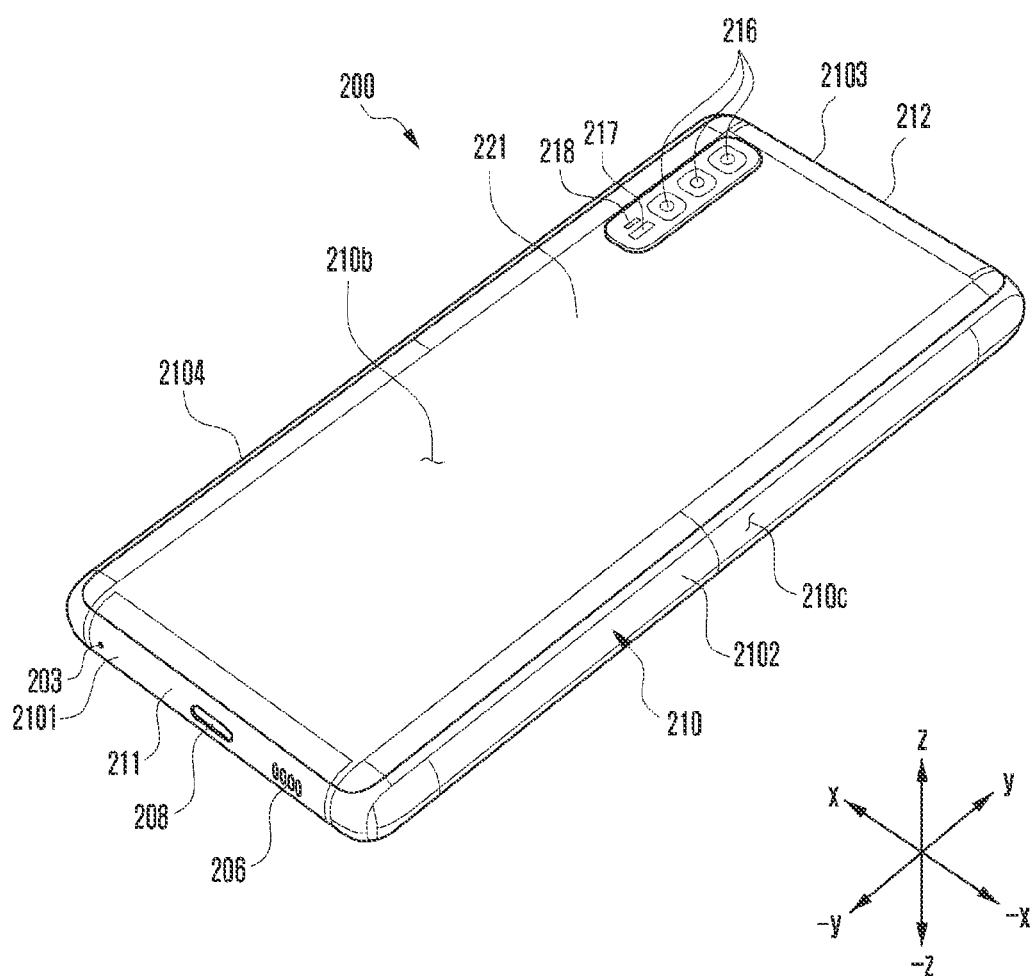
FIG. 3A is a rear perspective view of an electronic device, illustrating an example slide-in state according to various embodiments.
Figure 3B:
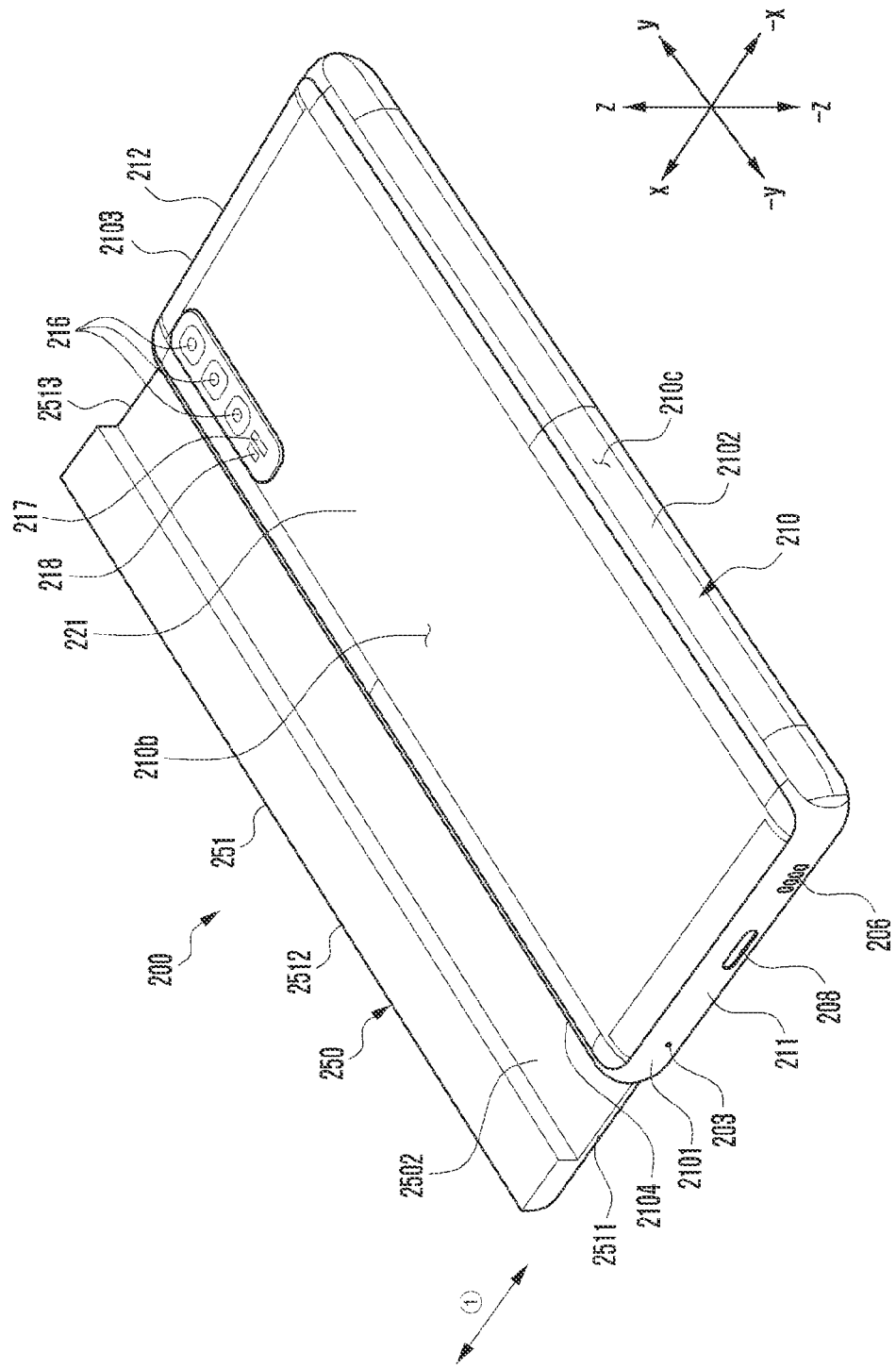
FIG. 3B is a rear perspective view of an electronic device, illustrating an example slide-out state according to various embodiments.

FIG. 2A is a front perspective view of an electronic device, illustrating an example slide-in state according to various embodiments, and FIG. 2B is a front perspective view of an electronic device, illustrating an example slide-out state according to various embodiments. FIG. 3A is a rear perspective view of an electronic device, illustrating an example slide-in state according to various embodiments, and FIG. 3B is a rear perspective view of an electronic device, illustrating an example slide-out state according to various embodiments.

The electronic device 200 of FIGS. 2A, 2B, 3A and 3B (which may be referred to hereinafter as "FIGS. 2A to 3B) may be at least partially similar to the electronic device 101 of FIG. 1 or may include other embodiments of an electronic device.

Figure 4:
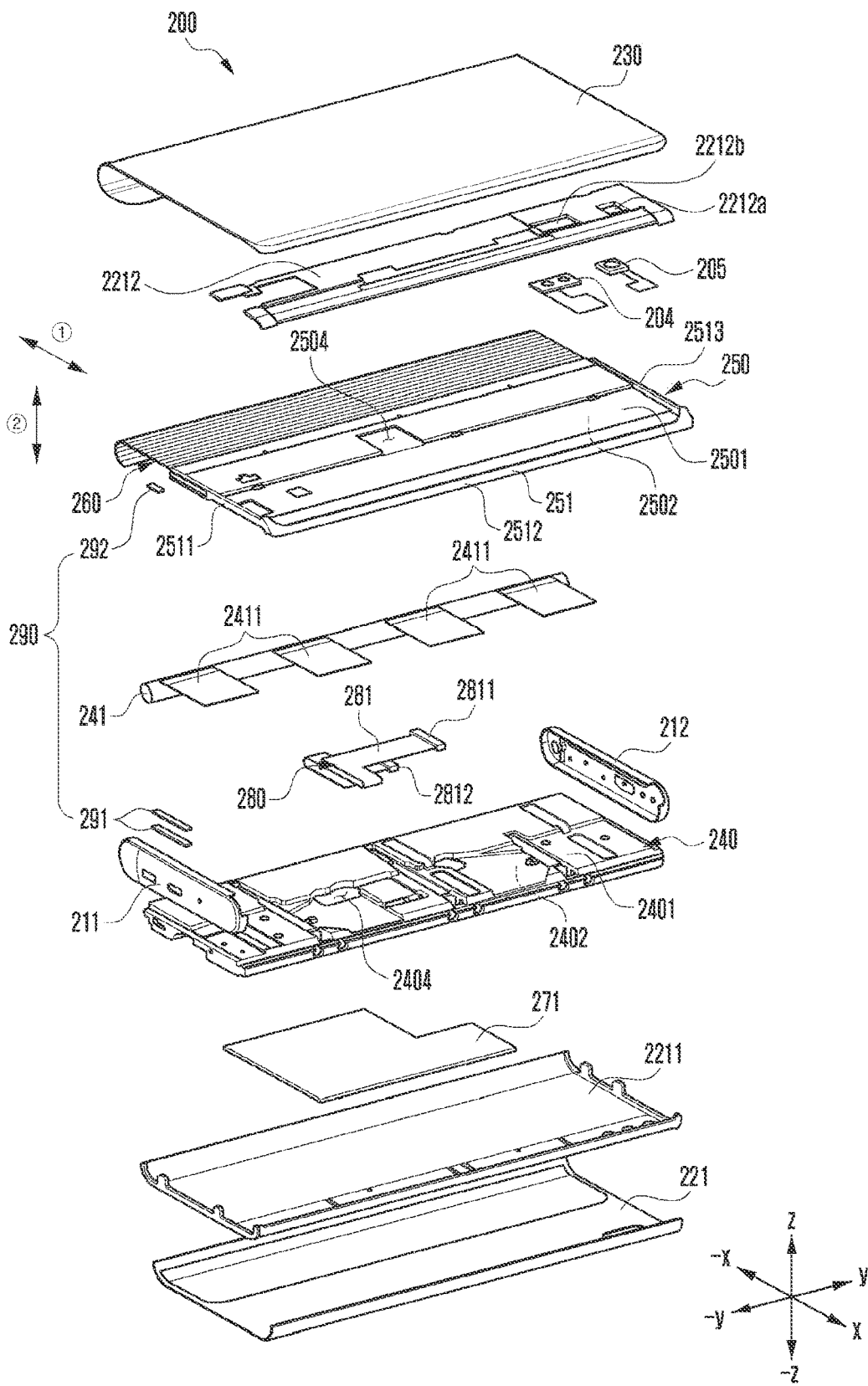
FIG. 4 is an exploded perspective view of an electronic device according to various embodiments.

Referring to FIGS. 2A to 3B, the electronic device 200 may include: a housing 210 (e.g., a housing structure, a first housing, or a base housing); a slide structure 250 (e.g., a slide structure, a second housing, or a slide housing) coupled to be movable from the housing 210 by a predetermined reciprocating distance in a predetermined direction (e.g., X-axis direction); a bendable member or a bendable support (e.g., the bendable member 260 of FIG. 4) (e.g., hinge rail or articulated hinge module) coupled to one end of the slide structure 250 and received in an inner space of the housing 210 in a slide-in state by bending; and a flexible display 230 (e.g., expandable display) disposed to be supported by the slide structure 250 and the bendable member (e.g., the bendable member 260 of FIG. 4). According to an embodiment, in a slide-in state, the flexible display 230 may be received in the inner space of the housing 210 while being supported by the bendable member (e.g., the bendable member 260 of FIG. 4), and thus may be disposed to be invisible from the outside. According to an embodiment, in a slide-out state, the flexible display 230 may be disposed to be visible from the outside while being supported by the bendable member (e.g., the bendable member 260 of FIG. 4) forming a plane same as that of the slide structure 250.

According to various embodiments, the electronic device 200 may include a housing 210 (e.g., housing structure) including: a front surface 210a (e.g., first surface) directed to a first direction (e.g., Z-axis direction); a rear surface 210b

(e.g., second surface) directed to a second direction (e.g., −Z-axis direction); and a side surface 210c surrounding a space between the front surface 210a and the rear surface 210b and at least partially exposed to the outside. According to an embodiment, the rear surface 210b may include a rear cover 221 including at least a part of the housing 210. According to an embodiment, the housing 210 may be configured by: a base bracket (e.g., the base bracket 240 of FIG. 4) disposed in the inner space of the electronic device 200 and guiding the slide structure 250; one or more side covers 211 and 212, each of which is coupled to at least a part of the base bracket (e.g., the base bracket 240 of FIG. 4); and at least one part of a rear cover 221. According to an embodiment, the rear cover 221 may be formed of polymer, coated or colored glass, ceramic, metal (e.g., aluminum, stainless steel (STS), or magnesium), or a combination of at least two among the above materials. In various embodiments, the rear cover 221 may extend up to at least a part of the side surface 210c.

According to various embodiments, the side surface 210c may include: a first side surface 2101 having a first length; a second side surface 2102 extending in a direction perpendicular from the first side surface 2101 to have a second length longer than the first length; a third side surface 2103 extending parallel to the first side surface 2101 from the second side surface 2102 and having the first length; and a fourth side surface 2104 extending parallel to the second side surface 2102 from the third side surface 2103 and having the second length. According to an embodiment, the slide structure 250 may support the flexible display 230, and may be slid out from the second side surface 2102 in the direction of the fourth side surface 2104 (e.g., X-axis direction) to increase the display area of the flexible display 230 or may be slid in from the fourth side surface 2104 in the direction of the second side surface 2102 (e.g., −X-axis direction) to reduce the display area of the flexible display 230. According to an embodiment, the one or more side covers 211 and 212 may be disposed on the first side surface 2101 and the third side surface 2103, respectively.

According to various embodiments, the slide structure 250 may include a side surface member 251 at least partially supporting the flexible display 230 and disposed at a position at which the same is visible from the outside in a slide-in state and/or a slide-out state. According to an embodiment, the side surface member 251 may include: a fifth side surface 2511 slidably coupled to the first side surface 2101; a sixth side surface 2512 extending from the fifth side surface 2511 and at least partially facing the fourth side surface 2104 in a slide-in state; and a seventh side surface 2513 extending from the sixth side surface 2512 and slidably coupled to the third side surface 2103. According to an embodiment, the fifth side surface 2511 and the seventh side surface 2513 may be arranged to be invisible from the outside in a slide-in state by sliding in the inner space of the housing 210. According to various embodiments, the fifth side surface 2511 and the seventh side surface 2513 may also be arranged to be at least partially visible from the outside in a slide-in state by partially sliding in the inner space of the housing 210.

According to various embodiments, the flexible display 230 may include: a first area 230a (e.g., flat part) supported by the slide structure 250; and a second area 230b (e.g., bendable part) extending from the first area 230a and supported by the bendable member (e.g., the bendable member 260 of FIG. 4). According to an embodiment, when the electronic device 200 is in a slide-in state, the second area 230b of the flexible display 230 may be disposed to be slid in the inner space of the housing 210 and unexposed to the outside, and when the electronic device 200 is in a slide-out state, the second area 230b of the flexible display 230 may be exposed to the outside so as to extend from the first area 230a while being supported by the bendable member (e.g., the bendable member 260 of FIG. 4). Accordingly, the electronic device 200 may include a rollable type and/or a slidable type electronic device in which the display area of the flexible display 230 varies as the slide structure 250 moves from the housing 210.

According to various embodiments, the slide structure 250 may be coupled in a sliding manner to be at least partially slid in or slid out from the housing 210. For example, the electronic device 200 may be configured to have a first width W1 from the second side surface 2102 to the fourth side surface 2104 in a slide-in state. According to various embodiments, the electronic device 200 in a slide-out state may be operated to have a third width W3 greater than the first width W1 as the bendable member (e.g., the bendable member 260 of FIG. 4) slid in the housing 210 moves in a predetermined direction (e.g., X-axis direction) to have an additional second width W2. Therefore, the flexible display 230 may have a display area substantially of the first width W1 in the slid-in state, and may have an increased display area substantially of the third width W3 in the slide-out state. According to an embodiment, the flexible display 230 may also be disposed such that the same includes a flat surface, and curved surfaces extending from the flat surface toward the edges on both sides thereof.

According to various embodiments, the slide structure 250 may be operated through the user's manipulation. For example, the electronic device 200 may transition to a slide-in state or a slide-out state through the user's manipulation of pressing the outer surface of the flexible display 230 in a predetermined direction. In various embodiments, in the electronic device 200, the slide structure 250 may be automatically slid out in a predetermined direction (e.g., X-axis direction) through the operation of a button (not shown) of a locker (not shown) exposed to the outside. In this case, the slide structure 250 may be controlled such that the same is retained in the slide-in state through the locker (not shown) while holding a restoring force to be slid out by an elastic member (e.g., a torsion spring) when pressed in a predetermined direction (e.g., −X axis direction). In various embodiments, the slide structure 250 may be automatically operated through a driving mechanism (e.g., a driving motor, a reduction module and/or a gear assembly) disposed in the inner space of the housing 210. According to various embodiments, the electronic device 200 may be configured such that the operation of the slide structure 250 is controlled through a driving mechanism when an event for the transition of slide in/out state is detected in the electronic device 200 through a processor (e.g., the processor 120 of FIG. 1). In various embodiments, the processor (e.g., the processor 120 of FIG. 1) of the electronic device 200 may control the flexible display 230 such that an object is displayed in various manner and an application program is executed, in response to the display area of the flexible display 230 changing according to a slide-in state, a slide-out state, or an intermediate state.

According to various embodiments, the electronic device 200 may include at least one of an input device 203, sound output devices 206 and 207, sensor modules 204 and 217, camera modules 205 and 216, a connector port 208, a key input device (not shown), or an indicator (not shown). In another embodiment, the electronic device 200 may be configured such that at least one of the above-described elements is omitted or other elements are additionally included.

According to various embodiments, the input device 203 may include a microphone. In various embodiments, the input device 203 may include a plurality of microphones arranged to detect the direction of sound. The sound output devices 206 and 207 may include speakers. The sound output devices 206 and 207 may include an external speaker 206 and a call receiver 207. In another embodiment, the sound output devices 206 and 207 may include a speaker (e.g., piezo speaker) operated without a separate speaker hole.

According to various embodiments, the sensor modules 204 and 217 may generate electrical signals or data values corresponding to an internal operating state of the electronic device 200 or an external environmental state thereof. The sensor modules 204 and 217 may include, for example, a first sensor module 204 (e.g., proximity sensor or illumination sensor) disposed on the front surface 210a of the electronic device 200, and/or a second sensor module 217 (e.g., heart rate monitoring (HRM) sensor) disposed on the rear surface 210b of the electronic device 200. According to an embodiment, the first sensor module 204 may be disposed under the flexible display 230 with respect to the front surface 210a of the electronic device 200. According to an embodiment, the first sensor module 204 may include at least one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera modules 205 and 216 may include a first camera module 205 disposed on the front surface 210a of the electronic device 200, and a second camera module 216 disposed on the rear surface 210b of the electronic device 200. According to an embodiment, the electronic device 200 may include a flash 218 positioned near the second camera module 216. According to an embodiment, the camera modules 205 and 216 may include one or more lenses, an image sensor, and/or an image signal processor. According to an embodiment, the first camera module 205 may be configured to be disposed under the flexible display 230 and to photograph a subject through a part of the active area of the flexible display 230. According to an embodiment, the flash 218 may include, for example, a light emitting diode or a xenon lamp.

According to various embodiments, some camera modules 205 among the camera modules 205 and 216, some sensor modules 204 among the sensor modules 204 and 217, or the indicator may be arranged to be exposed through the flexible display 230. For example, some camera modules 205, some sensor modules 204, or the indicator may be disposed in the inner space of the electronic device 200 so as to contact the external environment through a transmission area or an opening formed by perforating the flexible display 230. According to an embodiment, an area where the flexible display 230 faces some camera modules 205, which is a part of an area for displaying contents, may also be formed as a transmission area having a predetermined transmittance. According to an embodiment, the transmission area may be formed to have a transmittance in the range of about 5% to about 20%. This transmission area may include an area overlapping with an effective area (e.g., a field of view) of some camera modules 205, through which light for generating an image formed by an image sensor passes. For example, the transmission area of the flexible display 230 may include an area having a pixel density and/or a wiring density lower than the periphery thereof. For example, the transmission area may replace the above-described opening. For example, some camera modules 205 may include an under display camera (UDC). In another embodiment, some sensor modules 204 may be arranged to perform a function thereof in the inner space of the electronic device 200 without being visually exposed through the flexible display 230.

According to various embodiments, the electronic device 200 may include at least one antenna (e.g., the antenna module 197 of FIG. 1). According to an embodiment, at least one antenna (e.g., the antenna module 197 in FIG. 1), for example, may be configured to transmit and receive a signal for wirelessly communicating with an external electronic device (e.g., the electronic device 104 in FIG. 1). According to an embodiment, the electronic device 200 may also include another antenna (not shown) disposed in the inner space thereof. According to an embodiment, another antenna may wirelessly transmit and receive power required for charging. According to various embodiments, at least one antenna and/or another antenna may include a legacy antenna, mmWave antenna, near field communication (NFC) antenna, a wireless charging antenna, and/or a magnetic secure transmission (MST) antenna.

The electronic device 200 according to various embodiments may include a friction reducing structure applied to a guide structure between the housing 210 and the slide structure 250. For example, the friction reducing structure may be disposed between the first side surface and the fifth side surface and/or between the third side surface and the seventh side surface. In various embodiments, the friction reducing structure may also be disposed between the bendable member (e.g., bendable member 260 of FIG. 4) and the housing 210. In various embodiments, the friction reducing structure may also be disposed between the flexible display 230 and the rear cover 221. The electronic device 200 according to the example embodiments may include a friction reducing structure to reduce the frictional resistance generated between the housing 210 and the slide structure 250 during the slide in/out operation, so as to improve a sliding feeling and reduce abrasion, thereby securing the reliability of the device. In addition, lifting of the flexible display 230, occurring during the slide in/out operation, may be prevented and/or reduced.

FIG. 4 is an exploded perspective view of an electronic device according to various embodiments.

Referring to FIG. 4, the electronic device 200 may include: a base bracket 240 including at least one guide roller 241 arranged rotatably; a slide structure 250 coupled to the base bracket 240 to be slidable by a predetermined reciprocating distance; a bendable member 260 disposed to move together with the slide structure 250; a flexible display 230 disposed to be supported by the slide structure 250 and the bendable member 260; a cover member 221 (e.g., rear cover) fixed to at least a part of the base bracket 240; and the one or more side covers 211 and 212, each of which is at least partially fixed to the base bracket 240 and forms at least a part of the side appearance of the electronic device. According to an embodiment, the side covers 211 and 212 may include a first side cover 211 and a second side cover 212 which are disposed opposite to each other. According to an embodiment, the electronic device 200 may form a housing (e.g., the housing 210 of FIG. 2A) (e.g., housing structure) including an inner space through the base bracket 240, the cover member 221, and the one or more side covers 211, 212. According to an embodiment, the electronic device 200 may include various electrical structures, such as a substrate 271, disposed in an inner space thereof.

According to various embodiments, the slide structure 250 may be formed at least partially in a plate shape, and may include: a first surface 2501 facing a first direction (e.g., z-axis direction); a second surface 2502 facing a second direction (e.g., −z-axis direction) opposite to the first direction; and a side member 251 at least partially surrounding a space between the first surface 2501 and the second surface 2502. In various embodiments, the side member 251 may be integrally formed with the slide structure 250. In various embodiments, the side member 251 may also be formed separately from the slide structure 250 to be structurally coupled thereto. According to an embodiment, at least a part of the first surface 2501 of the slide structure 250 may be formed in a shape for supporting the flexible display 230. According to an embodiment, the bendable member 260 (e.g., multi-bar assembly) may be coupled to be interlocked with the slide structure 250. According to an embodiment, when the electronic device 200 is in a slide-in state, the bendable member 260 may be slid in the housing (e.g., the housing 210 of FIG. 2A) together with a part of the flexible display 230 and thus may guide the flexible display 230 to have a first display area. According to an embodiment, when the electronic device 200 is in a slide-out state, the bendable member 260 may form a plane same as that of the slide structure 250 and guide the flexible display 230 such that a part thereof is visible from the outside. In this case, the flexible display 230 may have a second display area larger than the first display area.

According to various embodiments, the slide structure 250 may include at least one electronic component 204 or 205 disposed in a space formed through structural change of a first surface 2501 facing the flexible display 230 and/or the second surface 2502 between the slide structure 250 and the base bracket 240. According to an embodiment, the at least one electronic component 204 or 205 may include the camera module 205 and/or the sensor module 204. In various embodiments, the at least one electronic component may further include an antenna module (not shown) and/or a key button module (not shown). According to an embodiment, the at least one electronic component may be disposed to detect an external environment through the flexible display 230 when at least one electronic component includes the camera module 205 and/or the sensor module 204. According to an embodiment, the slide structure 250 may include a support cover 2212 for covering a part in which the at least one electronic component 204 and 205 is disposed, so as to form a flat surface for supporting the flexible display 230. In this case, the support cover 2212 may include at least one through holes 2212a or 2212b formed through a corresponding position at which the at least one electronic component (e.g., the camera module 205 and/or the sensor module 204) and the flexible display 230 face each other.

According to various embodiments, the base bracket 240 may include a third surface 2401 facing the slide structure 250, and a fourth surface 2402 facing the opposite direction of the third surface 2401 and facing the cover member 221. According to an embodiment, the base bracket 240 and/or the one or more side covers 211 and 212 may include a guide structure for receiving the slide structure 250 such that the same is slidable by a predetermined reciprocating distance (e.g., the guide slit 2111 of FIG. 5A). According to an embodiment, the at least one guide roller 241 rotatably disposed on the base bracket 240 may be disposed in a manner of supporting at least a part of the bendable member 260 connected to the slide structure 250. According to an embodiment, the electronic device 200 may include at least one tension belt 2411 which is supported by the guide roller 241 or disposed near the guide roller 241 and is used for supporting the bendable member 260 to prevent and/or reduce the bendable member 260 from lifting or drooping.

According to various embodiments, the electronic device 200 may include at least one support bracket 2211 (e.g., rear case) which is disposed between the base bracket 240 and the cover member 221 and provides rigidity to the electronic device 200 or provides a mounting space for components. In this case, the first substrate 271 (e.g., printed circuit board (PCB)) may be disposed in a space between the base bracket 240 and the support bracket 2211.

According to various embodiments, the electronic device 200 may include an electrical connection structure for electrically connecting the first substrate 271 to the flexible display 230. According to an embodiment, the electrical connection structure may include a bendable slide FPCB 280 for electrically connecting the substrate 271 to a display panel disposed to be folded toward the rear surface of the flexible display 230. According to an embodiment, the slide FPCB 280 may be disposed in a manner of passing through a first opening 2504 formed through the slide structure 250 and a second opening 2404 formed through the base bracket 240. For example, the slide FPCB 280 may include a connecting part 281 having a shape and length for receiving a slidable reciprocating distance (reciprocating stroke) of the slide structure 250, and one end 2811 of the connecting part 281 may be electrically connected to the display panel after passing through the first opening 2504 of the slide structure 250, and the other end 2812 of the connection part 281 may be electrically connected to the substrate 271 after passing through the second opening 2404 of the base bracket 240. According to an embodiment, the slide FPCB 280 and the flexible display 230 and/or the slide FPCB 280 and the substrate 271 may be electrically connected through a connector coupling structure (e.g., coupling structure of a receptacle and a connector).

The electronic device 200 according to an example embodiment may include a friction reducing structure 290 for reducing frictional resistance generated by the guide structure between the slide structure 250 and the base bracket 240 (e.g., housing). According to an embodiment, the friction reducing structure 290 may include at least one first magnet 291 disposed on the first side cover 211, and at least one second magnet 292 disposed on the fifth side surface 2511 of the slide structure 250 slidably guided to the first side cover. According to an embodiment, the at least one first magnet 291 and the at least one second magnet 292 may be arranged to be affected by the magnetic force along a second direction (direction 2) perpendicular to a first direction (direction 1)) in which the slide structure 250 slides. According to an embodiment, the at least one first magnet 291 and the at least one second magnet 292 may be arranged such that identical polarities face each other, at least partially, along the second direction (direction 2). Accordingly, the slide structure 250 and the first cover member 211 may have reduced frictional resistance due to the surface contact reduced through placement using the repulsive force of the magnets 291 and 292, during a sliding operation. In various embodiments, the friction reducing structure 290 may also be disposed on the second cover member 212 and the seventh side surface 2513 of the slide structure 250.

Hereinafter, the friction reducing structure will be described in greater detail with reference to the drawings.

Figure 5A:
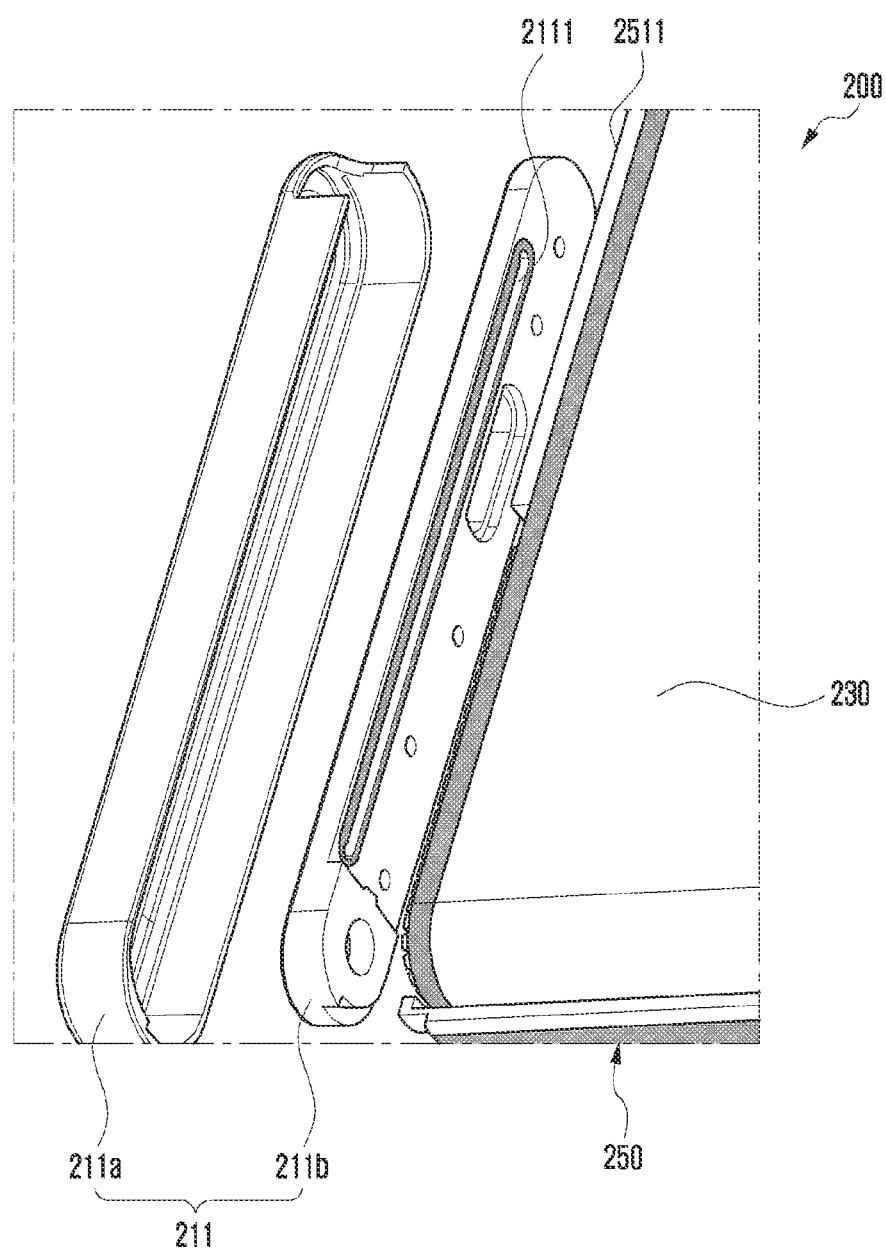
FIG. 5A is a partial perspective view of an electronic device, illustrating an example guide structure of a slide structure and a guide rail according to various embodiments.
Figure 5B:
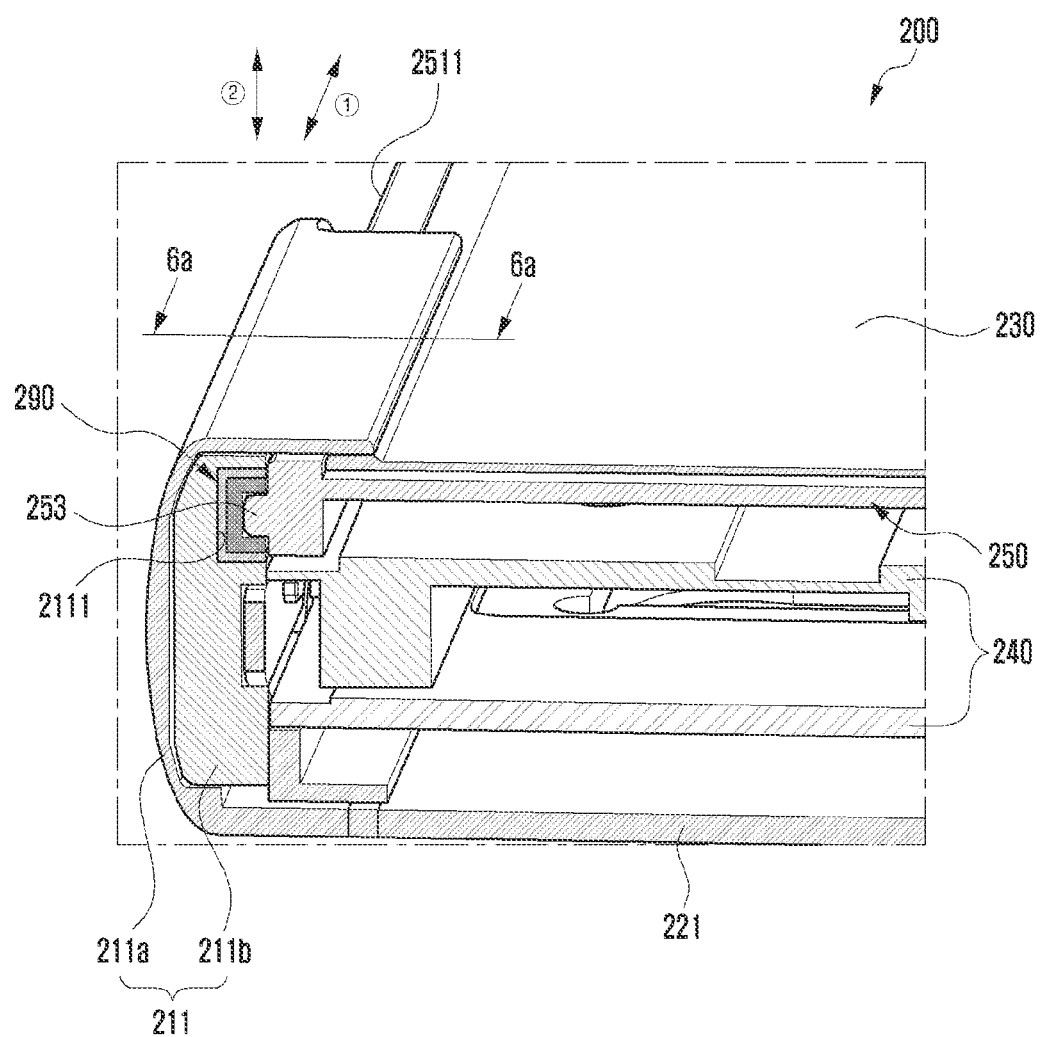
FIG. 5B is a partial cross-sectional perspective view of an electronic device, illustrating an example guide structure of a slide structure and a guide rail, and a friction reducing structure according to various embodiments.

FIG. 5A is a partial perspective view of an electronic device, illustrating an example guide structure of a slide structure and a guide rail according to various embodiments. FIG. 5B is a partial cross-sectional perspective view of an electronic device, illustrating an example guide structure of a slide structure and a guide rail, and a friction reducing structure according to various embodiments.

Referring to FIGS. 5A and 5B, the electronic device 200 may include a housing (e.g., the housing 210 of FIG. 2A) including the first side cover 211, and the slide structure 250 slidably disposed along the first side cover 211 of the housing 210. According to an embodiment, the first side cover 211 may include an outer cover 211a, and a guide rail 211b disposed on the outer cover 211a. According to an embodiment, the guide rail 211b may include a guide slit 2111 formed to have a predetermined length along the first direction (direction 1). According to an embodiment, the slide structure 250 may include a guide protrusion 253 protruding outward from the fifth side surface 2511 and guided along the guide slit 2111. According to an embodiment, one or more guide protrusions 253 may also protrude from the fifth side surface 2511.

According to various embodiments, the guide slit 2111 may have a width wide enough to guide the guide protrusion in the first direction (direction 1). Therefore, when the electronic device 200 transitions from a slide-in state to a slide-out state or transitions from the slide-out state to the slide-in state, the guide protrusion 253 may come into surface contact with the inner surface of the guide slit 2111. Therefore, the electronic device 200 may provide an uneven sliding feeling to a user due to the increased frictional resistance, and when the electronic device 200 is used for a long period of time, the operational reliability thereof may be decreased due to the foreign substances such as dust generated by the abrasion. Therefore, the electronic device 200 according to example embodiments may include the friction reducing structure 290 disposed between the guide slit 2111 and the guide protrusion 253. According to an embodiment, the friction reducing structure 290 may include at least one first magnet (e.g., the first magnet 291 of FIG. 6A) disposed on the guide slit 2111, and at least one second magnet (e.g., the second magnet 292 of FIG. 6A) disposed on the guide protrusion 253. According to an embodiment, the at least one first magnet (e.g., the first magnet 291 of FIG. 6A) and the at least one second magnet (e.g., the second magnet 292 of FIG. 6A) may be arranged to face each other so as to be affected by a magnetic force with respect to each other. For example, the at least one first magnet (e.g., the first magnet 291 of FIG. 6A) and the at least one second magnet (e.g., the second magnet 292 of FIG. 6A) may be arranged to have repulsive force with respect to each other along the vertical second direction (direction ②) perpendicular to the first direction (direction ①), and thus the frictional resistance due to contact between the guide protrusion 253 and the guide slit 2111 during the operation of the electronic device 200 may be reduced.

Figure 6A:
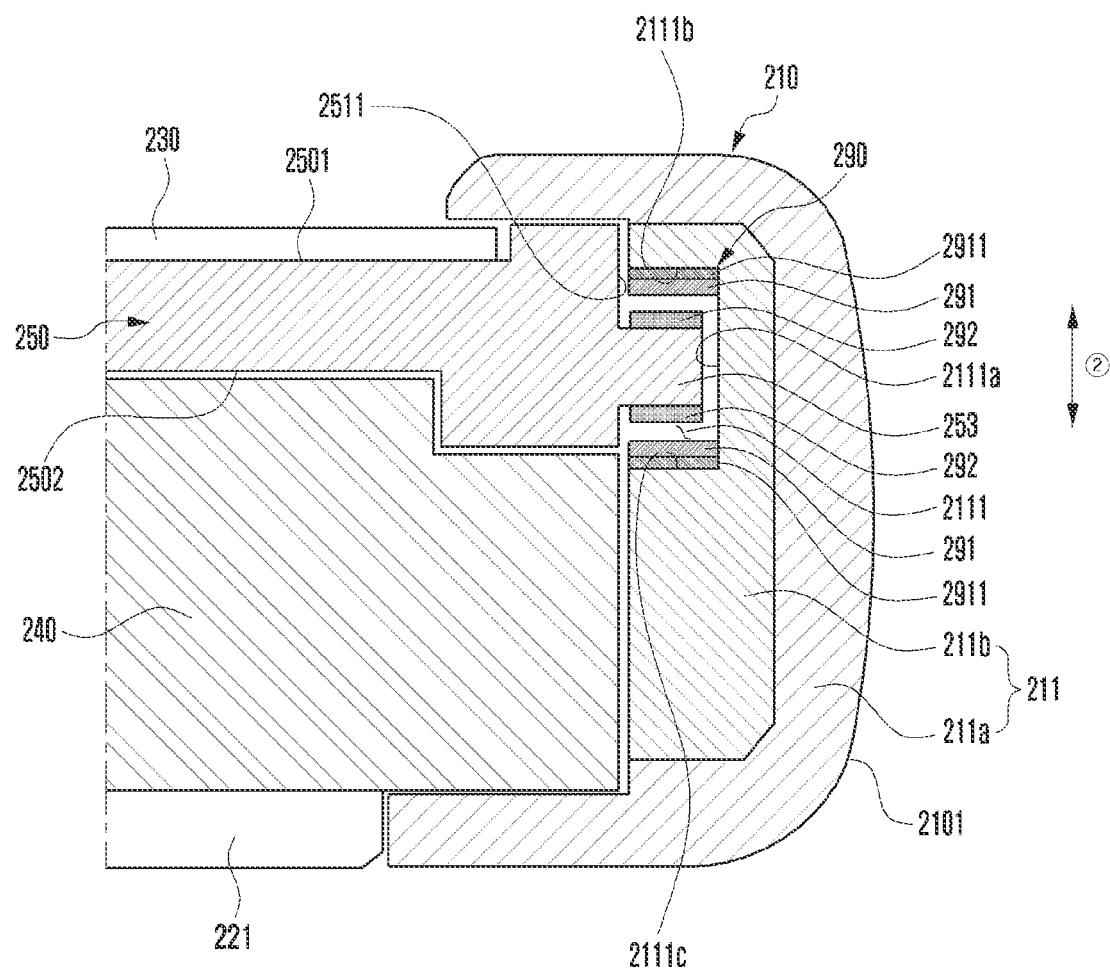
FIG. 6A is a partial cross-sectional view of an electronic device, taken along line 6a-6a of FIG. 5B, according to various embodiments.

FIG. 6A is a partial cross-sectional view of an electronic device, taken along line 6a-6a of FIG. 5B, according to various embodiments.

Referring to FIG. 6A, the electronic device 200 may include the base bracket 240, the housing 210 including the first side cover 211 coupled to the base bracket 240, and the slide structure 250 disposed to be slidable from the housing 210. According to an embodiment, the first side cover 211 may include the outer cover 211a and the guide rail 211b coupled to the outer cover 211a. According to an embodiment, the slide structure 250 may be slid in and/or slid out the housing 210 as the guide protrusion 253 protruding from the fifth side surface 2511 is guided along the guide slit 2111 formed in the guide rail 211b. According to an embodiment, the guide protrusion 253 may be integrally formed with the slide structure 250. In various embodiments, the guide protrusion 253 may also be formed separately from the slide structure 250 to be structurally coupled thereto.

According to various embodiments, the friction reducing structure 290 may include at least one first magnet 291 disposed on the inner surface of the guide slit 2111 of the guide rail 211b, and at least one second magnet 292 disposed at a position affected by the magnetic force of the first magnet 291, in the outer surface of the guide protrusion 253. According to an embodiment, the at least one first magnet 291 and the at least one second magnet 292 may be arranged such that identical polarities face each other at least partially, thereby generating the repulsive forces with respect to each other. For example, when the guide protrusion 253 is guided in the guide slit 2111, the guide protrusion 253 may come into surface contact with the guide slit 2111 in a second direction (direction 2) perpendicular to a first direction (direction 1) in which the slide structure 250 moves. Accordingly, the at least one first magnet 291 may be arranged on each of an upper inner surface 2111b and an lower inner surface 2111c of the guide slit 2111, with the guide protrusion 253 and the at least one second magnet 292 interposed therebetween, and the guide protrusion 253 and the inner side surface 2111a of the guide slit 2111 may be spaced apart from each other at a predetermined interval. Through this arrangement structure, the guide protrusion 253 may move without contacting the inner surface of the guide slit 2111 through the repulsive force acting between the at least one first magnet 291 and the at least one second magnet 292, and thus may provide an improved sliding feeling and reduce abrasion. According to an embodiment, the friction reducing structure 290 may include a shielding member 2911 disposed between the at least one first magnet 291 and each of the inner surfaces of the guide slit 2111. According to an embodiment, the shielding member 2911 may prevent and/or reduce external foreign substances (e.g., metal dust) affected by the magnetic force of the at least one first magnet 291 and the at least one second magnet 292 from sticking to the electronic device 200.

Figure 6B:
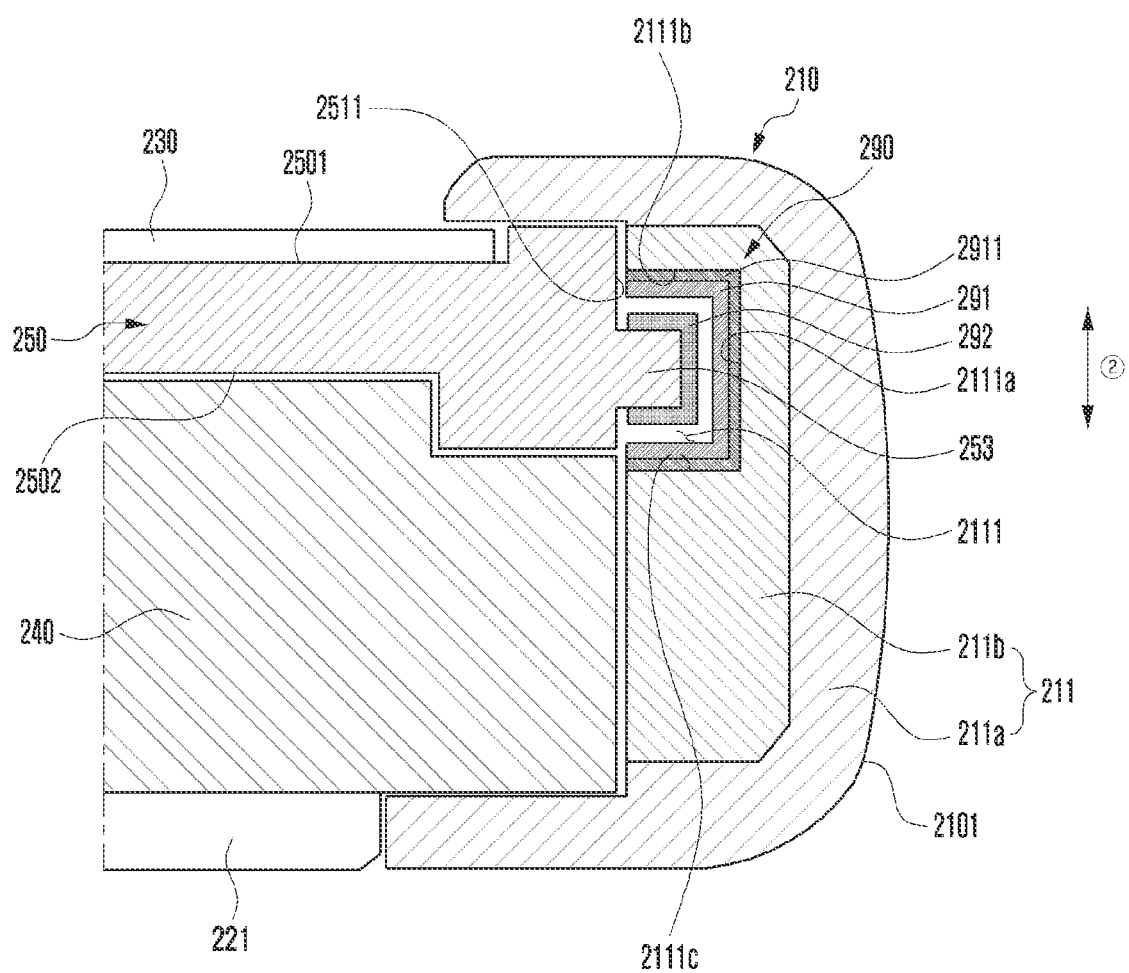
FIG. 6B is a partial cross-sectional view of an electronic device including a friction reducing structure according to various embodiments.
Figure 6C:
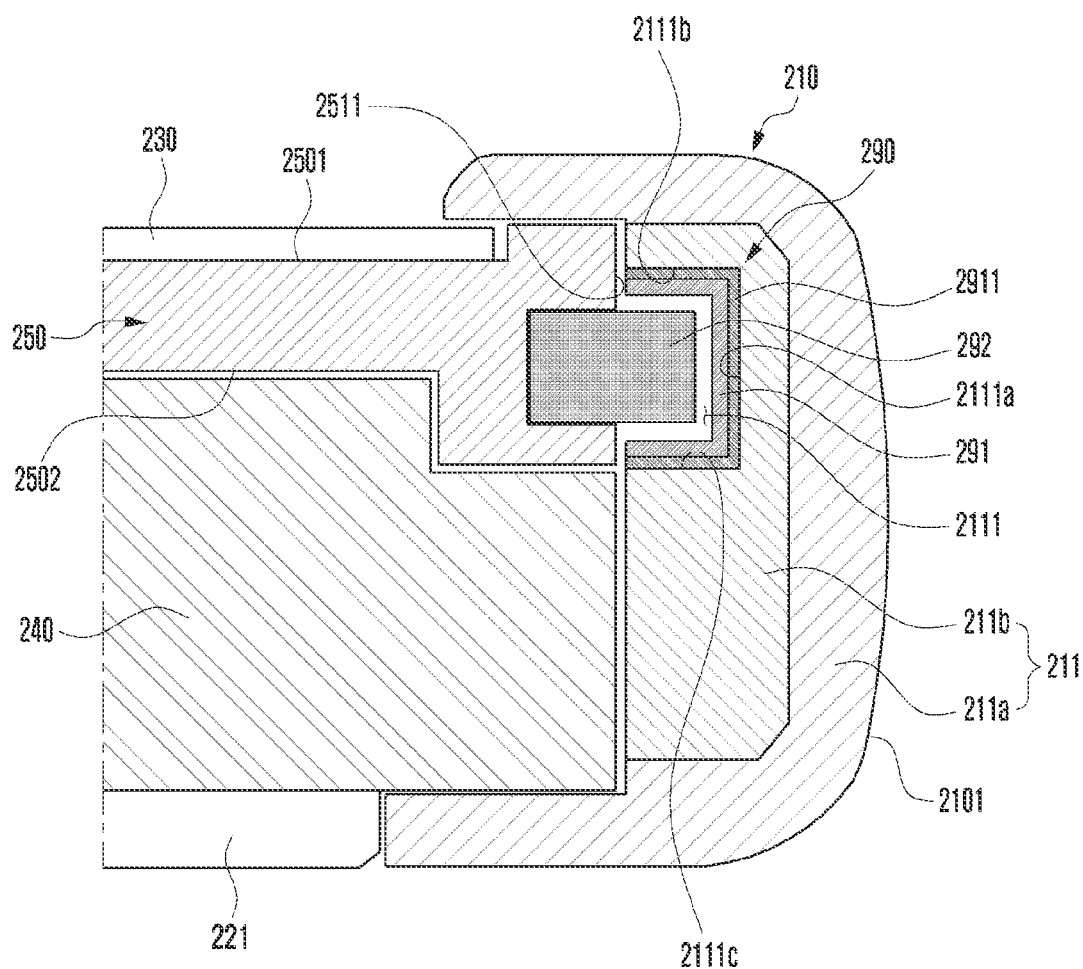
FIG. 6C is a partial cross-sectional view of an electronic device including a friction reducing structure according to various embodiments.

FIG. 6B is a partial cross-sectional view of an electronic device including a friction reducing structure according to various embodiments, and FIG. 6C is a partial cross-sectional view of an electronic device including a friction reducing structure according to various embodiments.

In the description of the electronic device 200 of FIGS. 6B and 6C, the same reference numerals are assigned to components that are substantially the same as those of the electronic device 200 of FIG. 6A, and detailed descriptions thereof may be omitted.

Referring to FIG. 6B, the friction reducing structure 290 may include a first magnet 291 disposed on the guide slit 2111, and a second magnet 292 disposed on the guide protrusion 253 to face the first magnet 291. According to an embodiment, the first magnet 291 may be disposed in a manner of surrounding the second magnet 292 and the guide protrusion 253 in the guide slit 2111. For example, the first magnet 291 may be disposed in a manner of surrounding the inner surfaces of the guide slit 2111 along the upper inner surface 2111b, the inner side surface 2111a, and the lower inner surface 2111c. In this case, the shielding member 2911 may also be disposed to correspond to the first magnet 291 between the first magnet 291 and the inner surface of the guide slit 2111.

Referring to FIG. 6C, the friction reducing structure 290 may include a first magnet 291 disposed in the guide slit 2111, and a second magnet 292 coupled to the slide structure 250 to face the first magnet 291. According to an embodiment, the second magnet 292 may be disposed to protrude from the fifth side surface 2511 of the slide structure 2500 by a predetermined amount, and thus may also serve as the aforementioned guide protrusion 253.

Figure 7A:
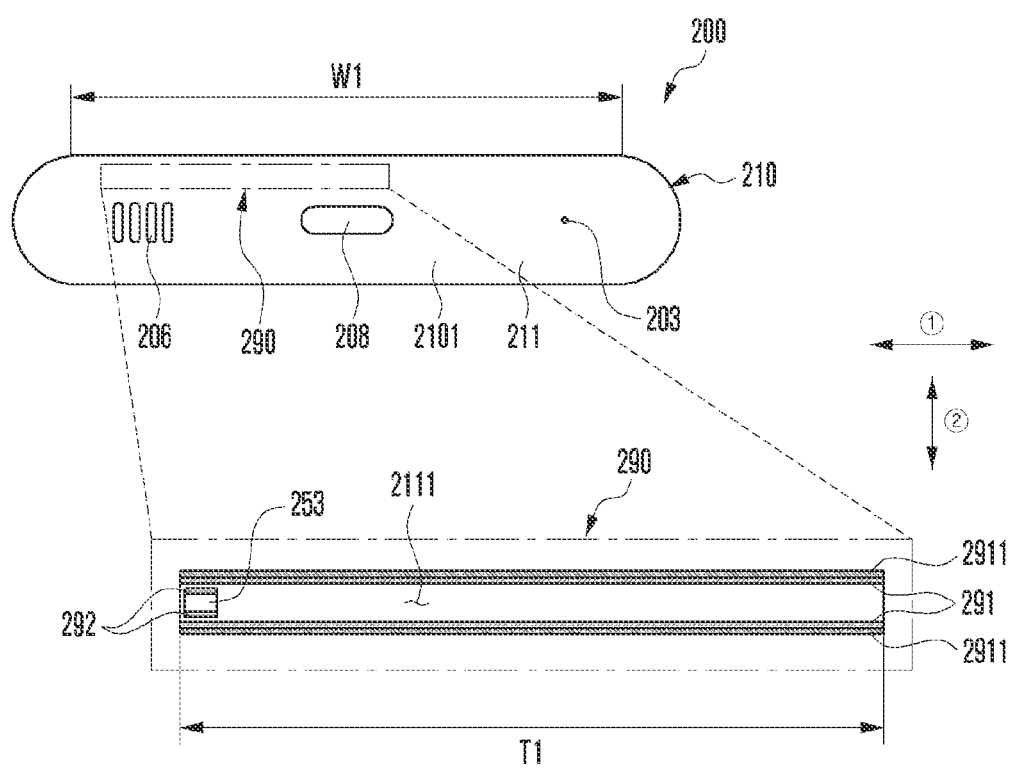
FIG. 7A is a diagram illustrating an example arrangement position of a first magnet in a slide-in state of an electronic device according to various embodiments.
Figure 7B:
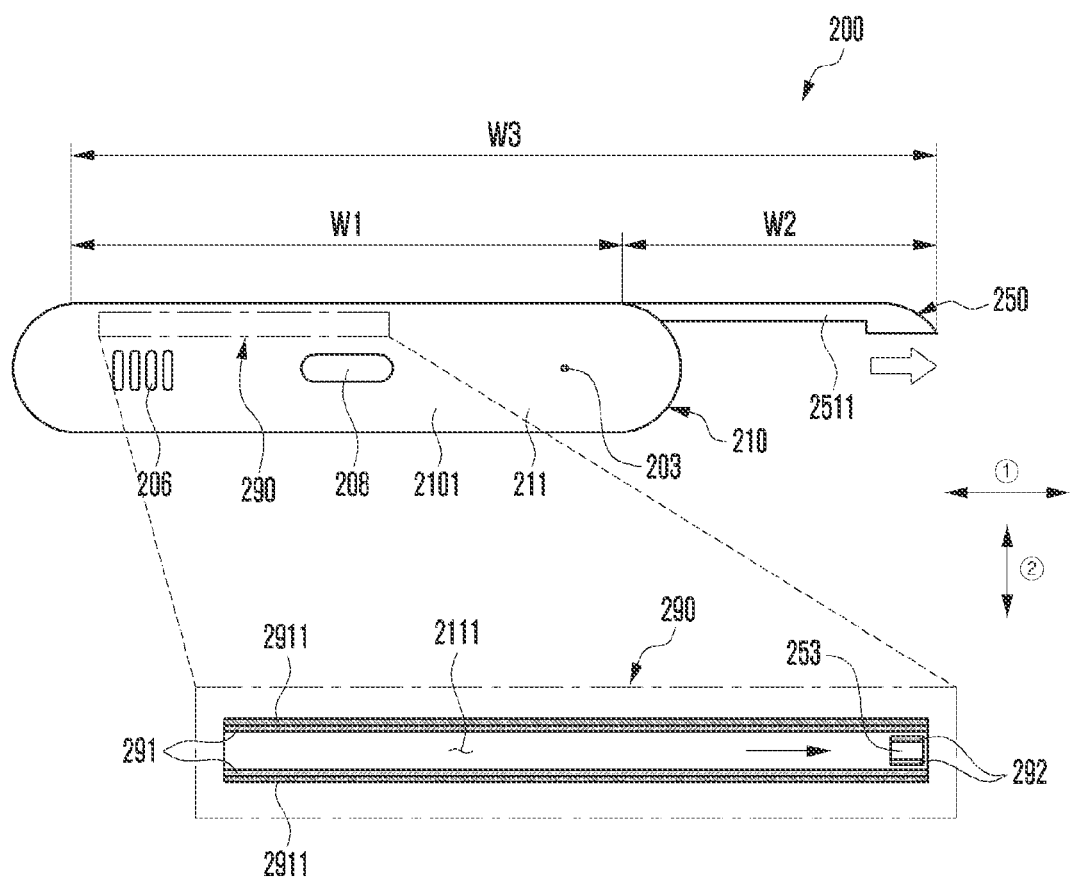
FIG. 7B is a diagram illustrating an example arrangement position of a first magnet in a slide-out state of an electronic device according to various embodiments.

FIG. 7A is a diagram illustrating an example arrangement position of a first magnet in a slide-in state of an electronic device according to various embodiments. FIG. 7B is a diagram illustrating an example arrangement position of a first magnet in a slide-out state of an electronic device according to various embodiments.

Referring to FIGS. 7A and 7B, the electronic device 200 may include the housing 210, and the slide structure 250 disposed to be slidable from the housing 210 by a predetermined reciprocating distance in the first direction (direction ①). According to an embodiment, the electronic device 200 may be operated to have a first width W1 in a slide-in state (e.g., in the state in FIG. 7A) and to have a third width W3 greater than the first width W1 in a slide-out state (e.g., in the state in FIG. 7B) as the slide structure 250 extends by a second width W2. Accordingly, the total length T1 of the guide slit 2111 formed on the first side cover 211 and guiding the guide protrusion 253 of the slide structure 250 may be at least equal to or longer than the extended second width W2 of the slide structure 250.

According to various embodiments, when the electronic device 200 transitions from a slide-in state to a slide-out state, or when the electronic device 200 transitions from the slide-out state to the slide-in state, the at least one second magnet 292 and the at least one first magnet 291 disposed on the inner surface of the guide slit 2111 may be arranged to have a repulsive force with respect to each other so as to push each other in the second direction (direction ②) perpendicular to the first direction (direction ①), and thus the guide protrusion 253 may be guided without contacting the inner surface of the guide slit 2111. Accordingly, during the sliding operation, the guide protrusion 253 may have minimized and/or reduced surface contact with the guide slit 2111 and thus have reduced frictional resistance.

Figure 8A:
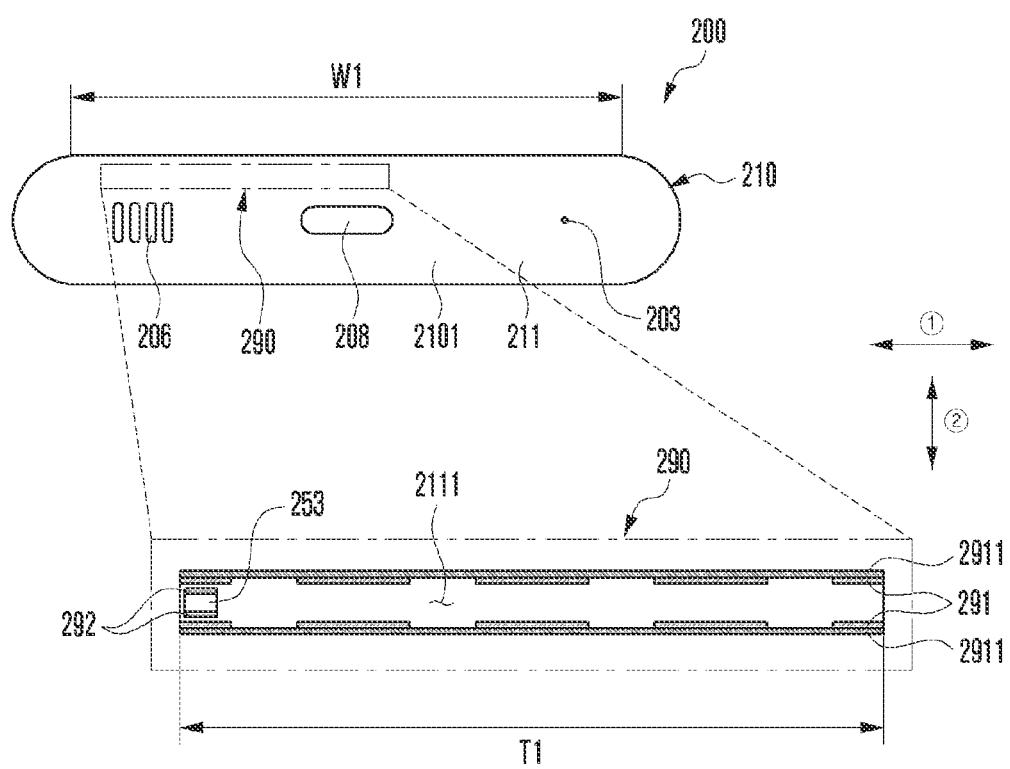
FIG. 8A is a diagram illustrating an example friction reducing structure disposed in an electronic device according to various embodiments.
Figure 8B:
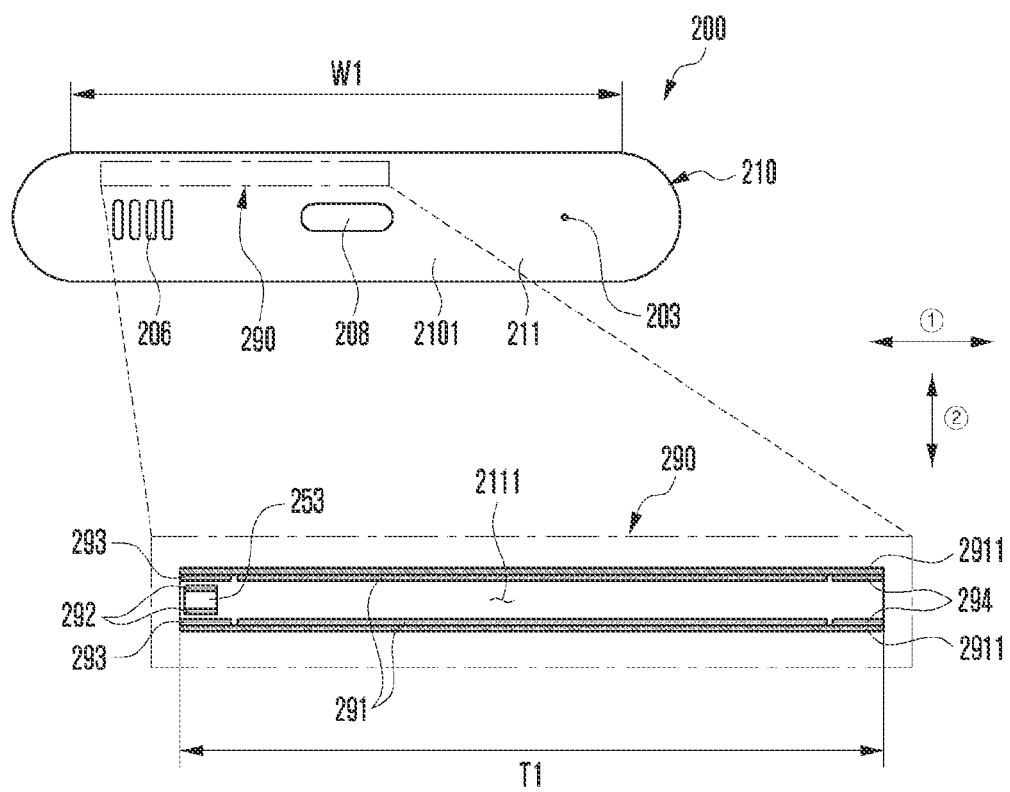
FIG. 8B is a diagram illustrating an example friction reducing structure disposed in an electronic device according to various embodiments.

FIG. 8A is a diagram illustrating an example friction reducing structure disposed in an electronic device according to various embodiments, and FIG. 8B is a diagram illustrating an example friction reducing structure disposed in an electronic device according to various embodiments.

In the description of the electronic device 200 of FIGS. 8A and 8B, the same reference numerals are assigned to components that are substantially the same as or similar to those of the electronic device 200 of FIGS. 7A and 7B, and detailed descriptions thereof may not be repeated here.

Referring to FIG. 8A, the friction reducing structure 290 may include at least one first magnet 291 disposed in the guide slit 2111, and at least one second magnet 292 facing the first magnet 291 to react with each other and disposed on the guide protrusion 253. According to an embodiment, the at least one first magnet 291 may include a plurality of magnets arranged at a predetermined interval. In this case, the at least one second magnet 292 disposed on the guide protrusion 253 may react with the plurality of magnets arranged at a predetermined interval to sequentially have a repulsive force during the movement of the guide protrusion 253, and thus may not contact the inner surface of the guide slit 2111. According to an embodiment, the distance at which the plurality of magnets are spaced from each other may be determined within a range in which plurality of magnets react with the at least one second magnet 292 disposed on the guide protrusion 253 by the magnetic force.

Referring to FIG. 8B, the friction reducing structure 290 may include: a first magnet 291 disposed at a corresponding position of the guide slit 2111 and facing the guide protrusion 253 during a sliding operation of the electronic device 200 (e.g., intermediate state); a second magnet 292 disposed on the guide protrusion 253 such that, in connection with the first magnet 291, identical polarities face each other; a third magnet 293 disposed in the guide slit 2111 such that, in connection with the second magnet 292, different polarities face each other in the slide-in state of the electronic device 200; and a fourth magnet 294 disposed in the guide slit 2111 such that, in connection with the second magnet 292, different polarities face each other in the slide-out state of the electronic device 200.

According to various embodiments, the arrangement structure of magnets arranged to have an attractive force between the second magnet 292 and the third magnet 293 may continuously maintain the slide-in state of the electronic device. According to an embodiment, the arrangement structure of magnets arranged to have an attractive force between the second magnet 292 and the fourth magnet 294 may continuously maintain the slide-out state of the electronic device. According to an embodiment, the arrangement structure of magnets arranged to have a repulsive force between the first magnet 291 and the second magnet 292 may reduce the frictional resistance between the guide protrusion 253 and the guide slit 2111 during the sliding operation of the electronic device 200, thereby performing a smooth sliding operation. In various embodiments, the first magnet 291 may include a plurality of magnets arranged at predetermined interval.

Although not shown, when the above-described guide structure including a guide protrusion and a guide slit is applied to at least a part of a bendable member (e.g., the bendable member 260 of FIG. 4) and between a first side cover (e.g., the first side cover 211 of FIG. 2A) and/or a second side cover (e.g., the second side cover 212 of FIG. 2A), at least one friction reducing structure among the aforementioned friction reducing structures may be applied to the guide structure.

Figure 9A:
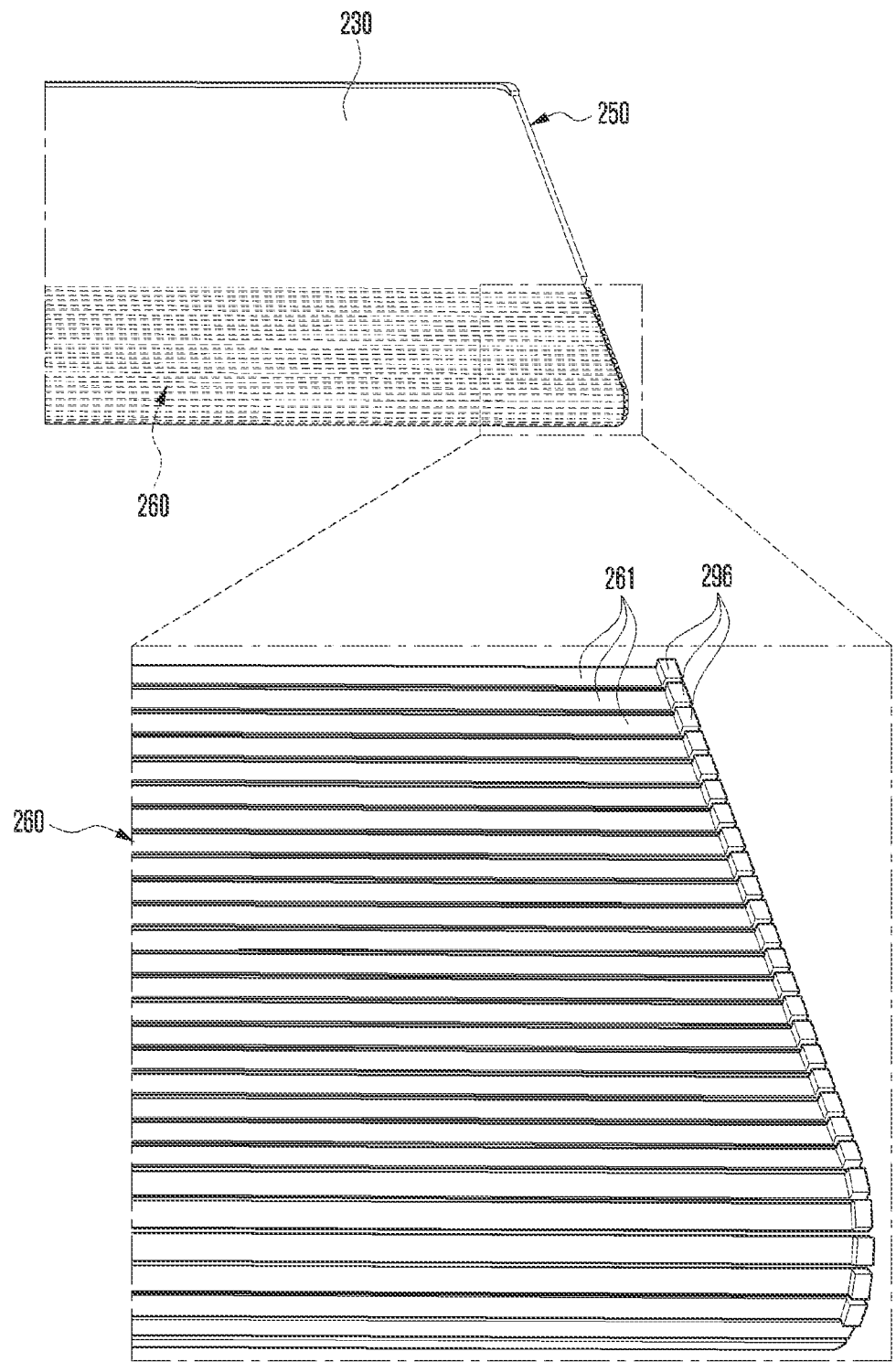
FIG. 9A is a partial perspective view of an electronic device, illustrating an example slide structure including a bendable member, according to various embodiments.
Figure 9B:
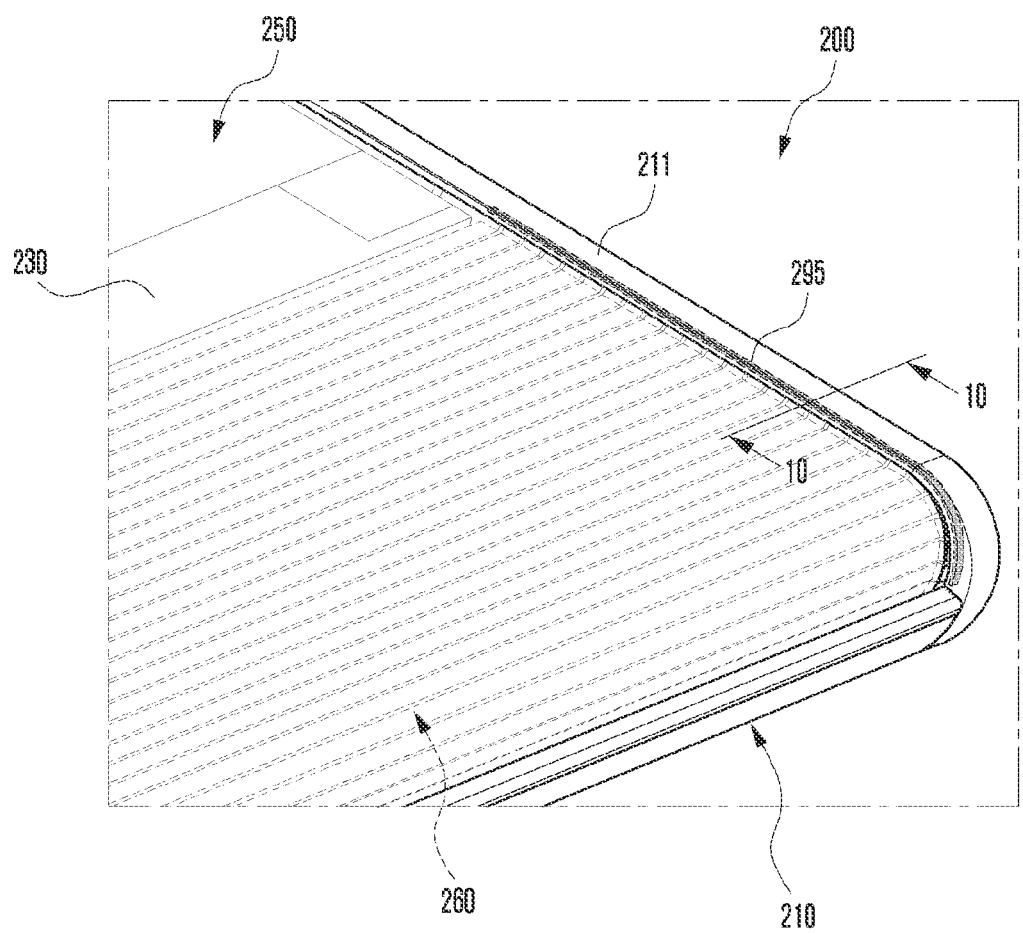
FIG. 9B is a partial perspective view of an electronic device, illustrating an example slide structure including a bendable member, according to various embodiments.
Figure 10:
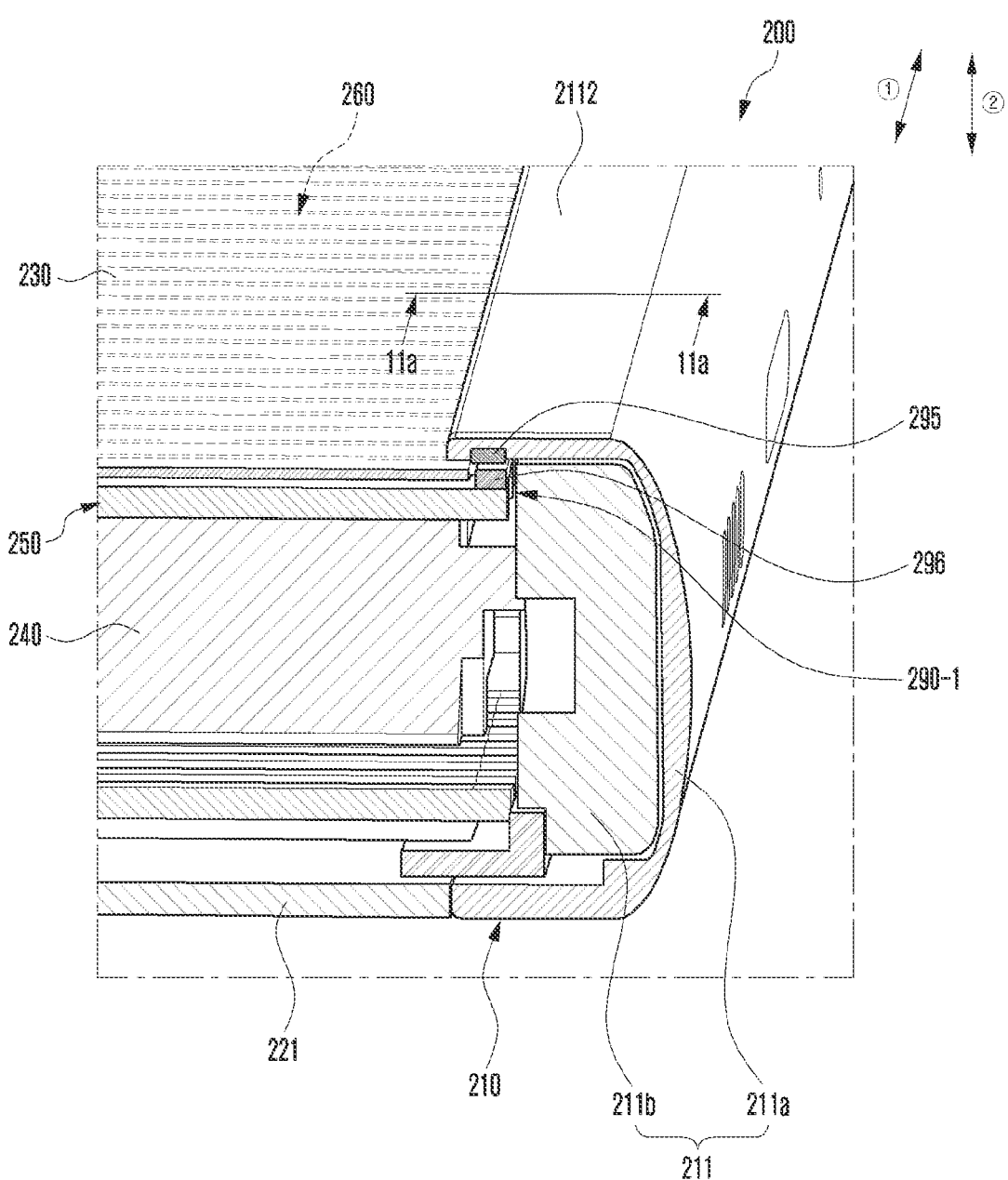
FIG. 10 is a partial cross-sectional view of an electronic device, taken along line 10-10 of FIG. 9B, according to various embodiments.

FIG. 9A is a partial perspective view of an electronic device, illustrating an example slide structure including a bendable member, according to various embodiments, and FIG. 9B is a partial perspective view of an electronic device, illustrating an example slide structure including a bendable member, according to various embodiments. FIG. 10 is a partial cross-sectional view of an electronic device, taken along line 10-10 of FIG. 9B, according to various embodiments.

Referring to FIGS. 9A, 9B and 10, the electronic device 200 may include the housing 210, and the slide structure 250 disposed to be movable from the housing 210 by a predetermined reciprocating distance in the first direction (direction ①)). According to an embodiment, the housing 210 may include the base bracket 240, and the side cover 211 coupled to the base bracket 240 (e.g., the first side cover 211 of FIG. 2A). The side cover 211 may include the outer cover 211a forming at least a part of the outer appearance of the electronic device 200, and the guide rail 211b coupled between the outer cover 211a and the base bracket 240. According to an embodiment, the electronic device 200 may include the bendable member 260 which is connected to the slide structure 250, received in the inner space of the housing 210 in a slide-in state, and forms a plane substantially the same as that of the slide structure 250 in a slide-out state, to support at least a part of the flexible display 230. According to an embodiment, the bendable member 260 may include a plurality of multi-bars 261 arranged to be rotatable with respect to each other so as to have a predetermined curvature during the slide in/out operation. According to an embodiment, the outer cover 211a may include a cover part 2112 extending to cover the edges of the flexible display 230 and/or the bendable member 260.

According to various embodiments, the electronic device 200 may include a friction reducing structure 290-1 disposed between the bendable member 260 and the cover part 2112 of the side cover 211 of the housing 210, and thus reduce the frictional resistance between the bendable member 260 and the housing 210 and prevent and/or reduce lifting of the flexible display 230. According to an embodiment, the friction reducing structure 290-1 may include a first magnet 295 disposed to face at least part of the plurality of multi-bars 261 at the cover part 2112, and a second magnet 296 disposed on each of the plurality of multi-bars 261 to face the first magnet 295 at the cover part 2112. In various embodiments, the second magnet 296 may be disposed on each of the designated multi-bars among the plurality of multi-bars 261. According to an embodiment, the first magnet 295 and the second magnet 296 may be disposed to face each other along the second direction (direction ②) substantially perpendicular to the first direction (direction ①). According to an embodiment, the first magnet 295 and the second magnet 296 may be arranged such that identical polarities face each other, thereby having a repulsive force. Accordingly, the bendable member 260 may be pushed in the direction of the base bracket 240 along the second direction (direction ②) through the repulsive force acting through the first magnet 295 and the second magnet 296, so that the frictional resistance with the cover part 2112 may be reduced, and the outward lifting occurring on the flexible display 230 supported by the bendable member 260 may also be reduced.

Figure 11A:
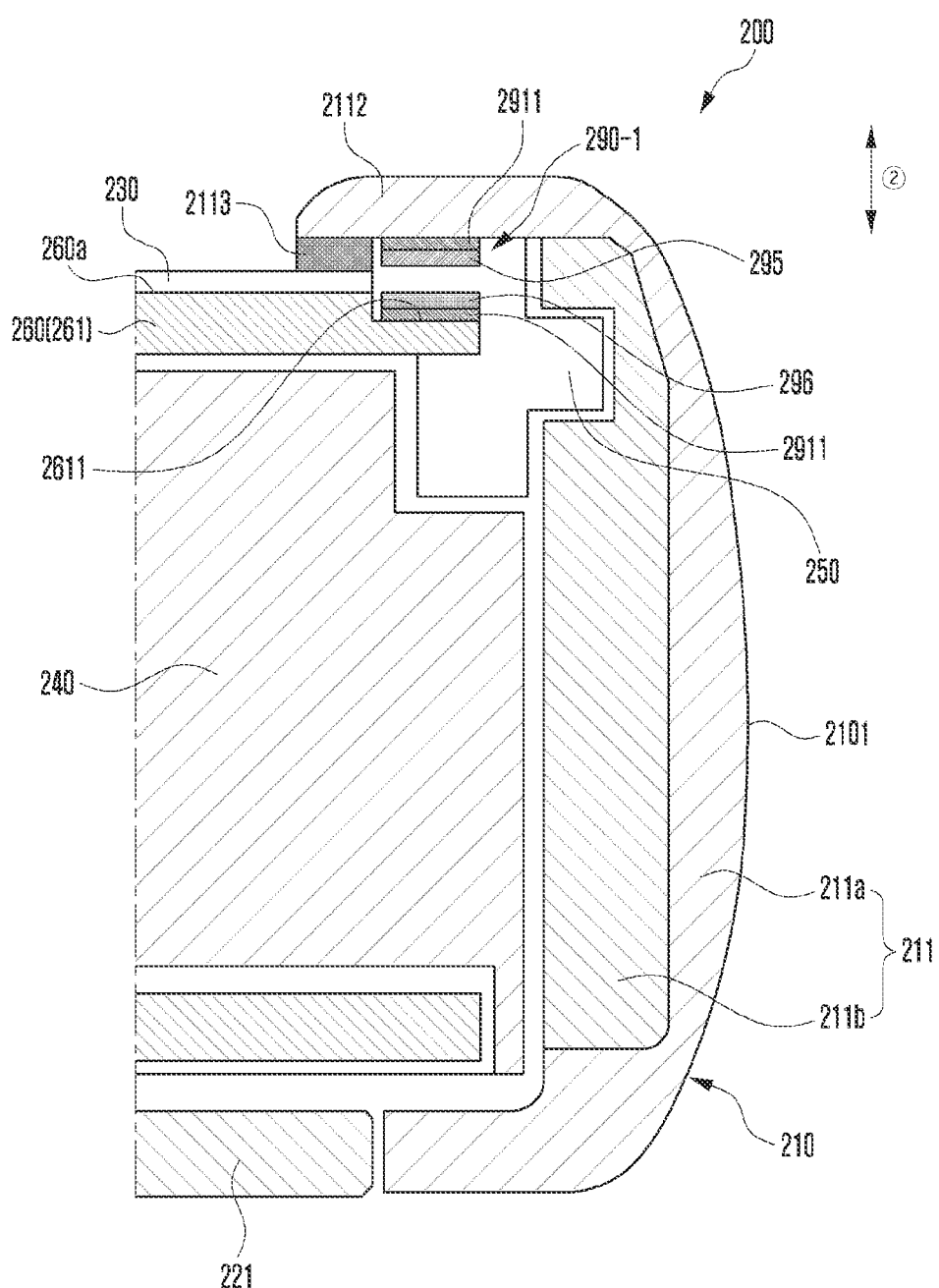
FIG. 11A is a partial cross-sectional view of an electronic device taken along line 11a-11a of FIG. 10 according to various embodiments.

FIG. 11A is a partial cross-sectional view of an electronic device taken along line 11a-11a of FIG. 10 according to various embodiments.

Referring to FIG. 11A, the electronic device 200 may include the housing 210 and the slide structure 250 disposed to be movable from the housing 210 by a predetermined reciprocating distance in a first direction (refer to direction ① of FIG. 10). According to an embodiment, the cover part 2112 of the side cover 211 may be arranged to overlap the edge of the flexible display 230 and/or at least a part of the bendable member 260 when the flexible display 230 is viewed from above. According to an embodiment, the electronic device 200 may include the friction reducing structure 290-1 disposed at an overlapping part where the cover part 2112 and the bendable member 260 overlap. According to an embodiment, the friction reducing structure 290-1 may include the first magnet 295 disposed to face at least a part of the plurality of multi-bars 261 at the cover part 2112, and the second magnet 296 disposed on the plurality of multi-bars 261 to face the first magnet 295 at the cover part 2112. According to an embodiment, the plurality of multi-bars 261 may include a recess 2611 lower than the outer surface 260a (e.g., support surface) supporting the flexible display 230, in order to receive the second magnet 296. According to an embodiment, when the second magnet 296 is disposed in the recess 2611, the second magnet 296 may form a plane substantially the same as that of the outer surface 260a of the plurality of multi-bars 261. According to an embodiment, the flexible display 230 may be disposed not to overlap the first magnet 295 and the second magnet 296. According to an embodiment, the electronic device 200 may further include a sweeper 2113 disposed between the cover part 2112 and the flexible display 230, thereby removing foreign substances attached to the outer surface of the flexible display 230. According to an embodiment, the sweeper 2113 may include a fabric or sponge.

According to various embodiments, the friction reducing structure 290-1 may include the shielding member 2911 disposed between the cover part 2112 and the first magnet 295 and/or between the plurality of multi-bars 261 and the second magnet 296. According to an embodiment, the shielding member 2911 may prevent and/or reduce external foreign substances (e.g., metal dust) affected by the magnetic force of the at least one first magnet 291 and the at least one second magnet 292 from sticking to the electronic device 200.

Figure 11B:
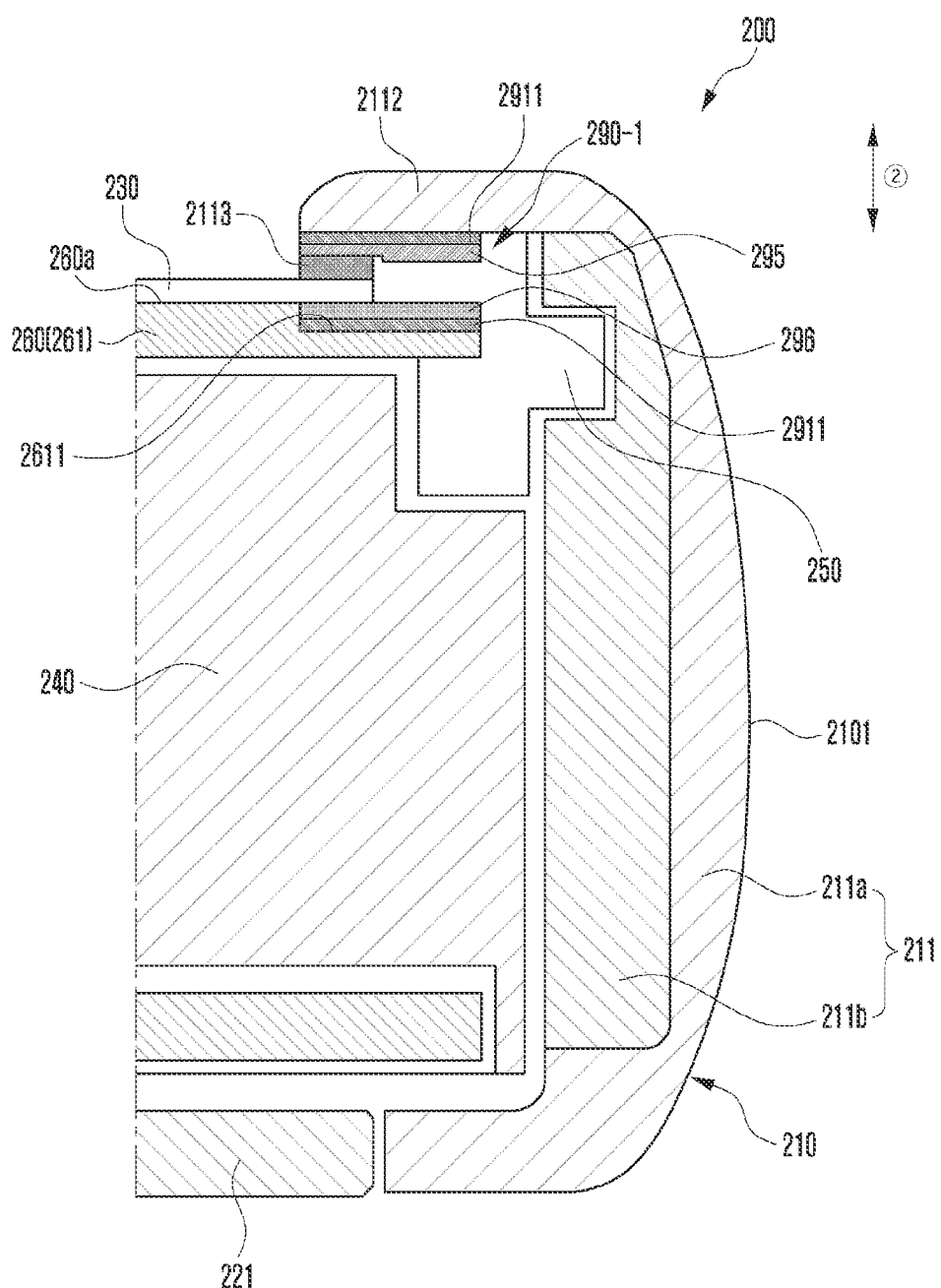
FIG. 11B is a partial cross-sectional view of an electronic device including a friction reducing structure according to various embodiments.
Figure 11C:
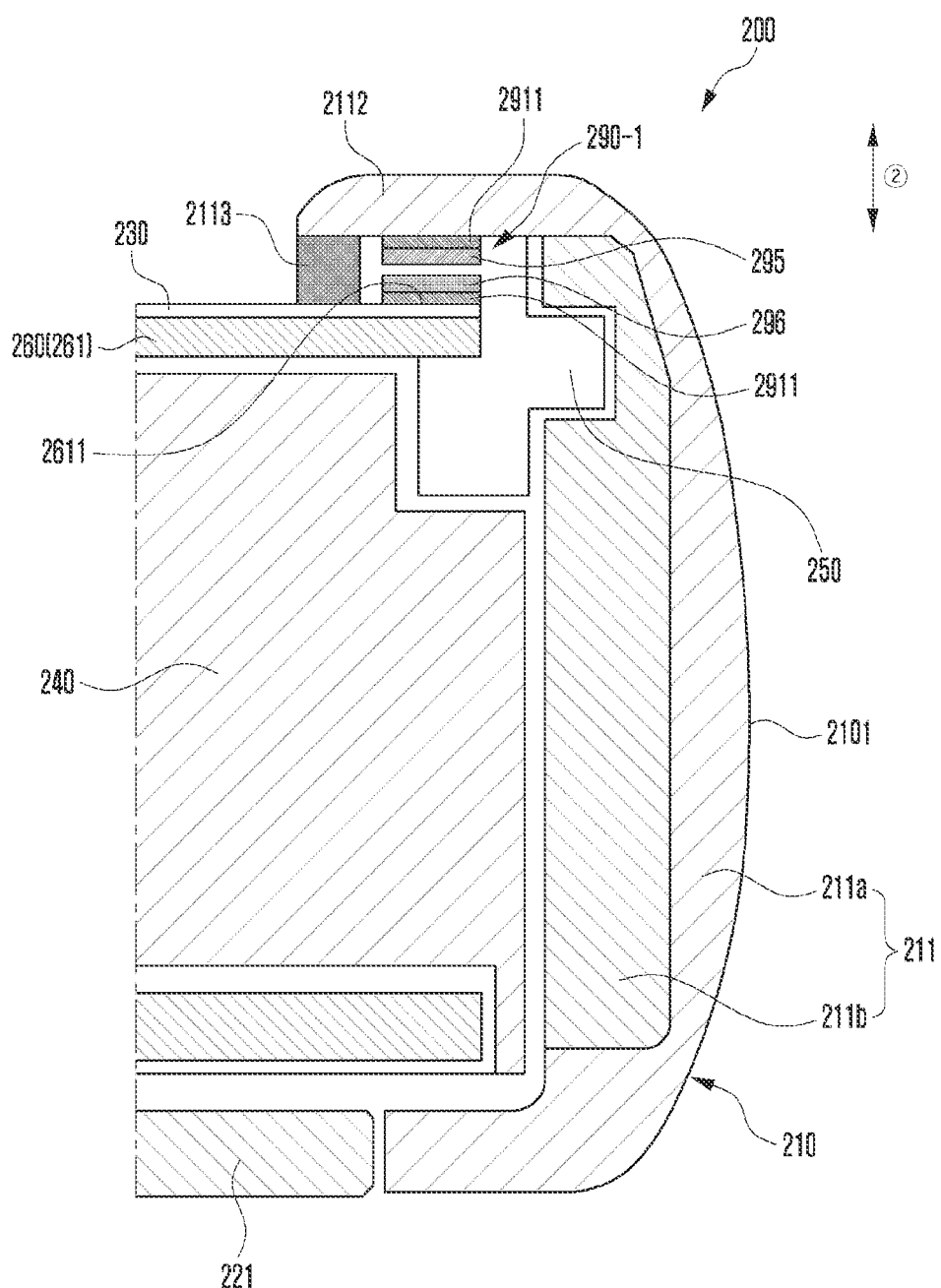
FIG. 11C is a partial cross-sectional view of an electronic device including a friction reducing structure according to various embodiments.

FIG. 11B is a partial cross-sectional view of an electronic device including a friction reducing structure according to various embodiments, and FIG. 11C is a partial cross-sectional view of an electronic device including a friction reducing structure according to various embodiments.

In the description of the electronic device 200 of FIGS. 11B and 11C, the same reference numerals are assigned to components that are substantially the same as those of the electronic device 200 of FIG. 11A, and detailed descriptions thereof may not be repeated here.

Referring to FIG. 11B, the electronic device 200 may include the friction reducing structure 290-1 disposed between the cover part 2112 of the side cover 211 and the flexible display 230 and/or the bendable member 260. According to an embodiment, the friction reducing structure 290-1 may include the first magnet 295 disposed to face at least a part of the plurality of multi-bars 261 at the cover part 2112, and the second magnet 296 disposed on the plurality of multi-bars 261 to face the first magnet 295 at the cover part 2112.

According to various embodiments, when the flexible display 230 is viewed from above, the first magnet 295 and the second magnet 296 may be arranged to at least partially overlap with the flexible display 230. In this case, the sweeper 2113 may be disposed between the first magnet 295 and the flexible display 230. According to an embodiment, the overlapping area where the flexible display 230 overlaps the first magnet 295 and the second magnet 296 may include an inactive area (e.g., black matrix (BM) area).

Referring to FIG. 11B, the electronic device 200 may include the friction reducing structure 290-1 disposed between the cover part 2112 of the side cover 211 and the flexible display 230. According to an embodiment, the friction reducing structure 290-1 may include the first magnet 295 disposed to face at least a part of the plurality of multi-bars 261 at the cover part 2112, and the second magnet 296 disposed at the edge of the flexible display 230 to face the first magnet 295 at the cover part 2112.

According to various embodiments, when the flexible display 230 is viewed from above, the first magnet 295 and the second magnet 296 may be arranged to overlap with the flexible display 230. In this case, the sweeper 2113 may be disposed between the cover part 2112 and the flexible display 230. According to an embodiment, the overlapping area where the flexible display 230 overlaps the first magnet 295, the second magnet 296, and the sweeper 2113 may include an inactive area (e.g., black matrix (BM) area).

Figure 12A:
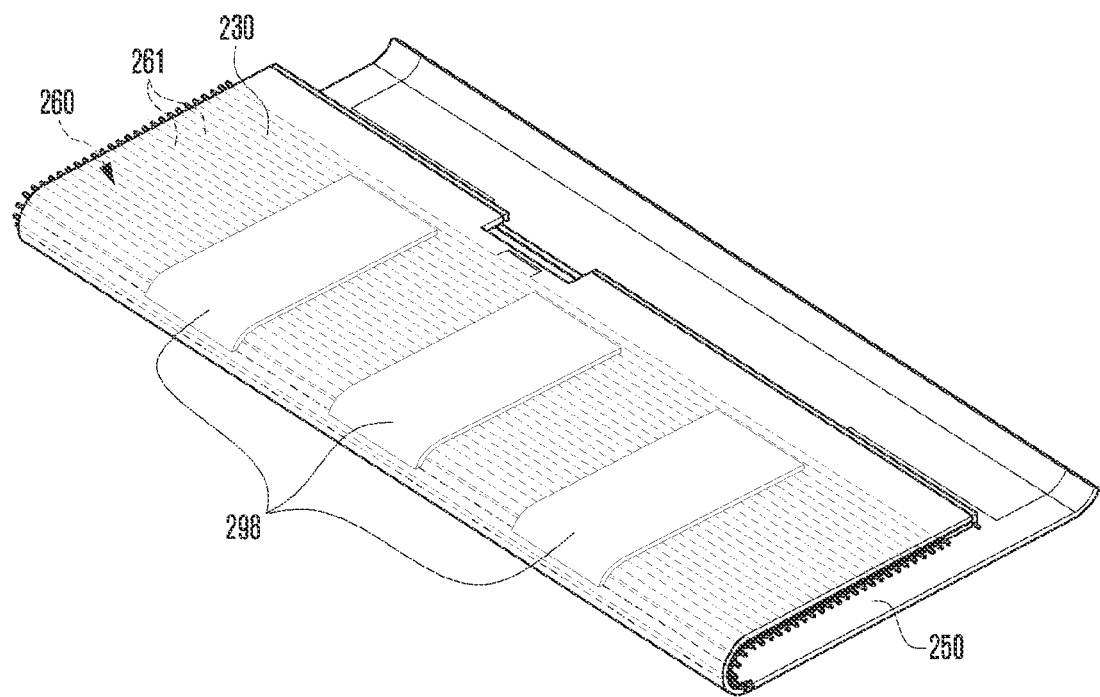
FIG. 12A is a perspective view illustrating an example slide structure including a bendable member, according to various embodiments.
Figure 12B:
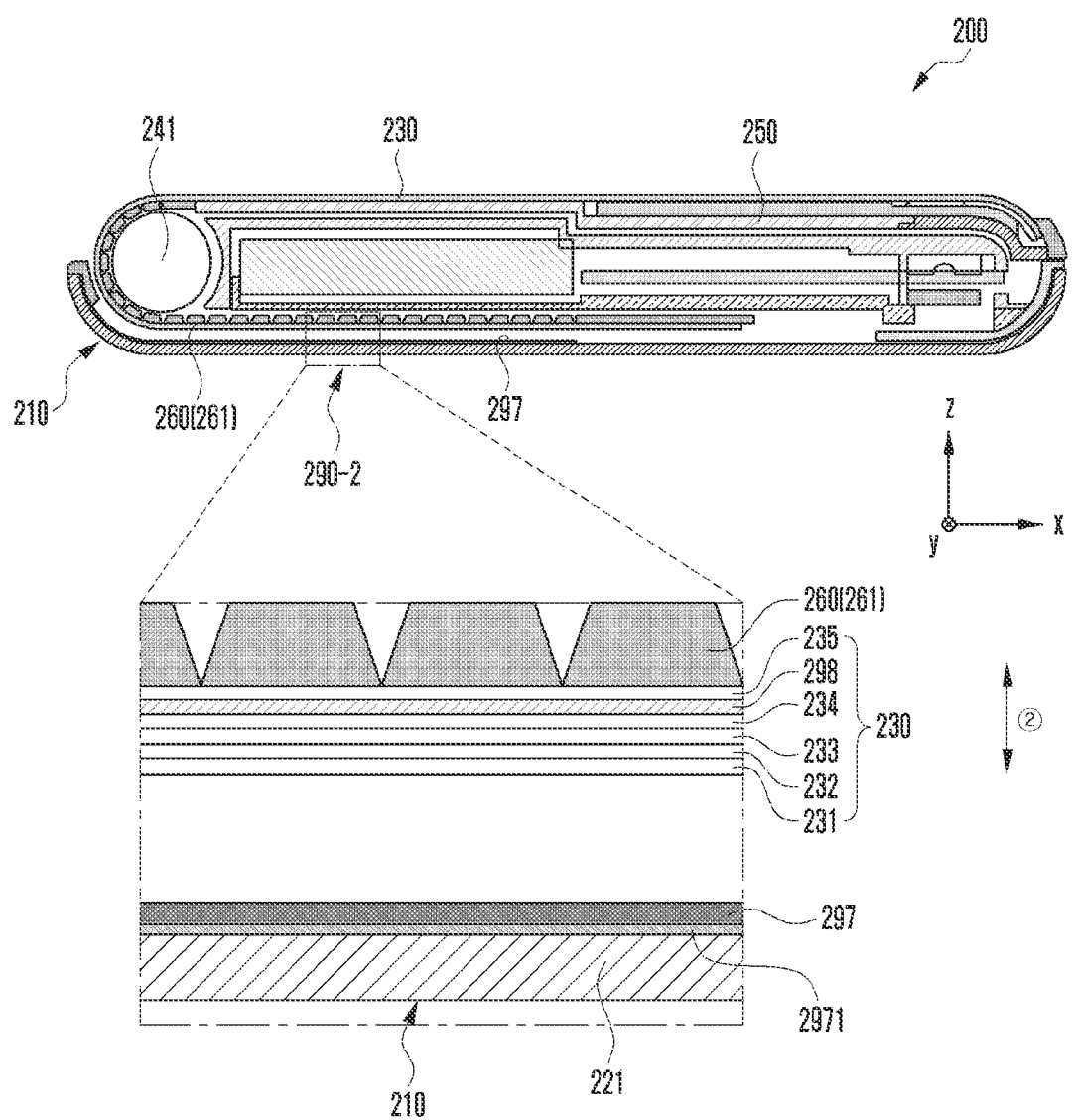
FIG. 12B is a cross-sectional view illustrating an example slide-in state of an electronic device including a friction reducing structure according to various embodiments.

FIG. 12A is a perspective view illustrating an example slide structure including a bendable member, according to various embodiments. FIG. 12B is a cross-sectional view illustrating an example slide-in state of an electronic device including a friction reducing structure according to various embodiments, and FIG. 12C is a cross-sectional view illustrating an example slide-out state of an electronic device including a friction reducing structure according to various embodiments.

Figure 12C:
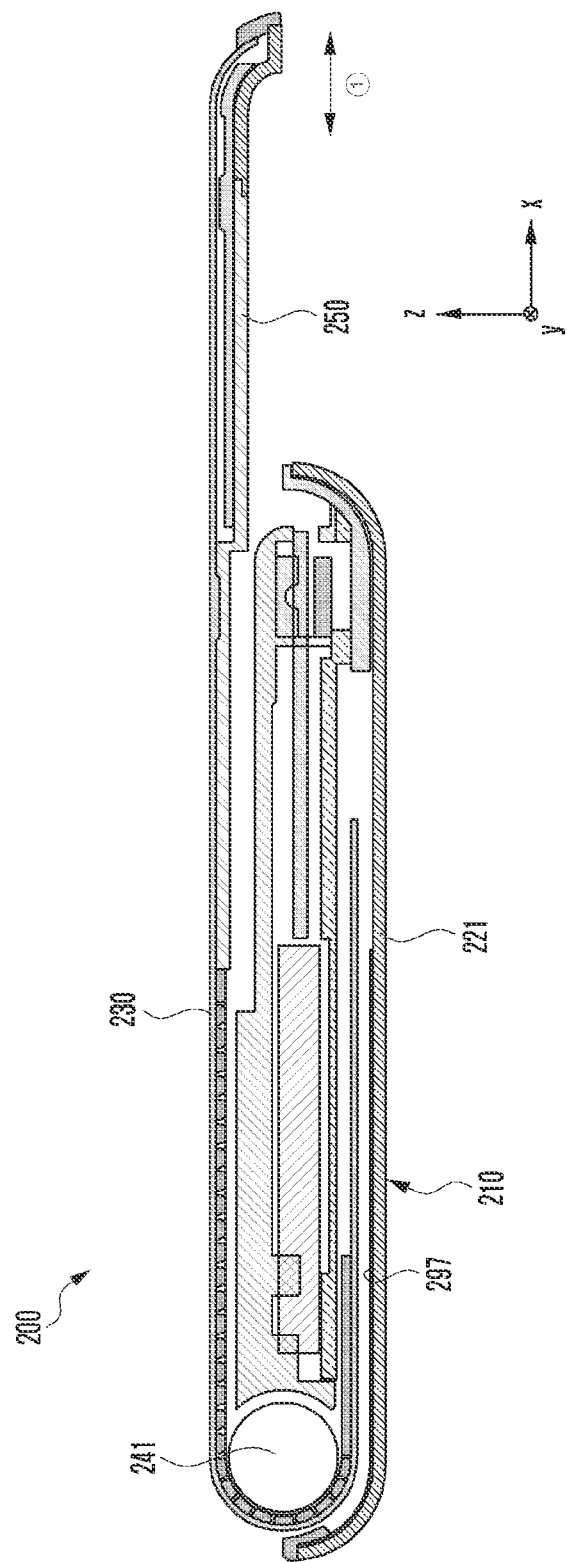
FIG. 12C is a cross-sectional view illustrating an example slide-out state of an electronic device including a friction reducing structure according to various embodiments.

Referring to FIGS. 12A, 12B and 12C, the electronic device 200 may include the housing 210, and the slide structure 250 disposed to be movable from the housing 210 by a predetermined reciprocating distance in the first direction (direction ①). According to an embodiment, the electronic device 200 may include a friction reducing structure 290-2 for providing tension and reducing the frictional resistance generated by the contact between the inner surface of the housing 210 and the flexible display 230 due to the drooping deformation of the flexible display 230 in the inner space of the housing 210 during the slide in/out operation. According to an embodiment, the friction reducing structure 290-2 may include a first magnet 297 disposed in the inner space of the housing 210, and a second magnet 298 disposed between layers among stacked layers of the flexible display 230 or on the outer surface of the flexible display 230. According to an embodiment, the first magnet 297 may be disposed in a manner to be attached in the form of a sheet to the inner surface of the cover member 221. According to an embodiment, the friction reducing structure 290-2 may further include a shielding member 2971 disposed between the first magnet 297 and the cover member 221. According to an embodiment, the second magnet 298 may be disposed in an area corresponding to the bendable member 260 received in the inner space of the housing 210 during operation of the electronic device 200.

According to various embodiments, the flexible display 230 may include: a window layer 231; a polarizing layer 232 sequentially disposed under the window layer 231; a display panel 233; a functional layer 234; and a metal sheet layer 235. According to an embodiment, the window layer 231 may include a polymer layer (e.g., PI or TPU) and/or a glass layer (e.g., ultra-thin glass (UTG)). According to an embodiment, the display panel 233 may include a plurality of pixels and a wiring structure (e.g., electrode pattern). According to an embodiment, the polarizing layer 232 may selectively pass light generated from a light source of the display panel 233 and vibrating in a certain direction. According to an embodiment, the display panel 233 and the polarizing layer 232 may be integrally formed with each other. According to an embodiment, the functional layer 234 may include a buffer layer for background demonstration and buffering, a graphite sheet for heat dissipation, an added display, a force touch FPCB, a fingerprint sensor FPCB, a communication antenna radiator, a digitizer, or a conductive/non-conductive tape. According to an embodiment, the metal sheet layer 235 may be disposed to provide flexural properties and rigidity to the flexible display 230. According to an embodiment, the second magnet 298 may be disposed under the display panel 233. According to an embodiment, the second magnet 298 may be disposed between the display panel 233 and the metal sheet layer 235. For example, the second magnet 298 may be disposed on various layers of the flexible display 230, through which a magnetic force can be transmitted through the display panel 233 and the window layer 231. In this case, the second magnet 298 may be formed of a thin film magnetized metal sheet. In various embodiments, the magnetized metal sheet may include a plurality of magnetized metal sheets spaced apart from each other at a predetermined interval.

According to various embodiments, when the electronic device 200 is operated in a slide-in state and/or in a slide-out state from the slide-in state, the repulsive force may be generated through the second magnet 298 disposed such that, in connection with the first magnet 297, identical polarities face each other, and the flexible display 230 may be retained in a state where the same is pressed in the direction of the bendable member 260 through the repulsive force, so that a drooping phenomenon of the flexible display 230 may be prevented and/or reduced and frictional resistance may be reduced.

Figure 13B:
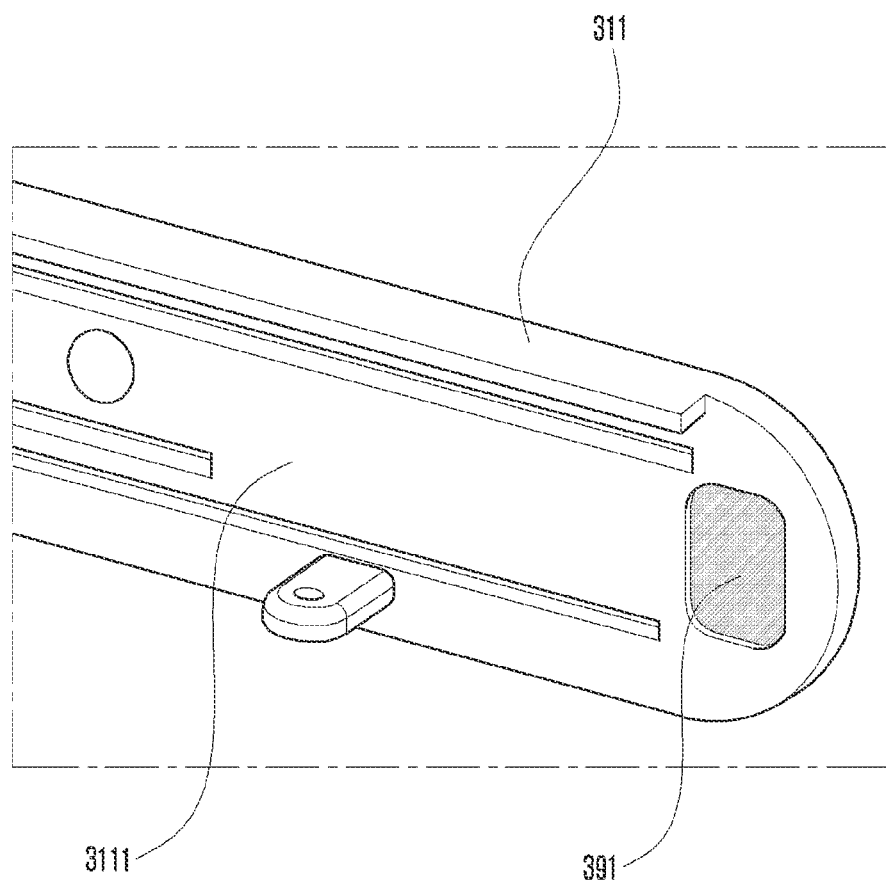
FIG. 13B is a partial perspective view illustrating an example cover member according to various embodiments.
Figure 13C:
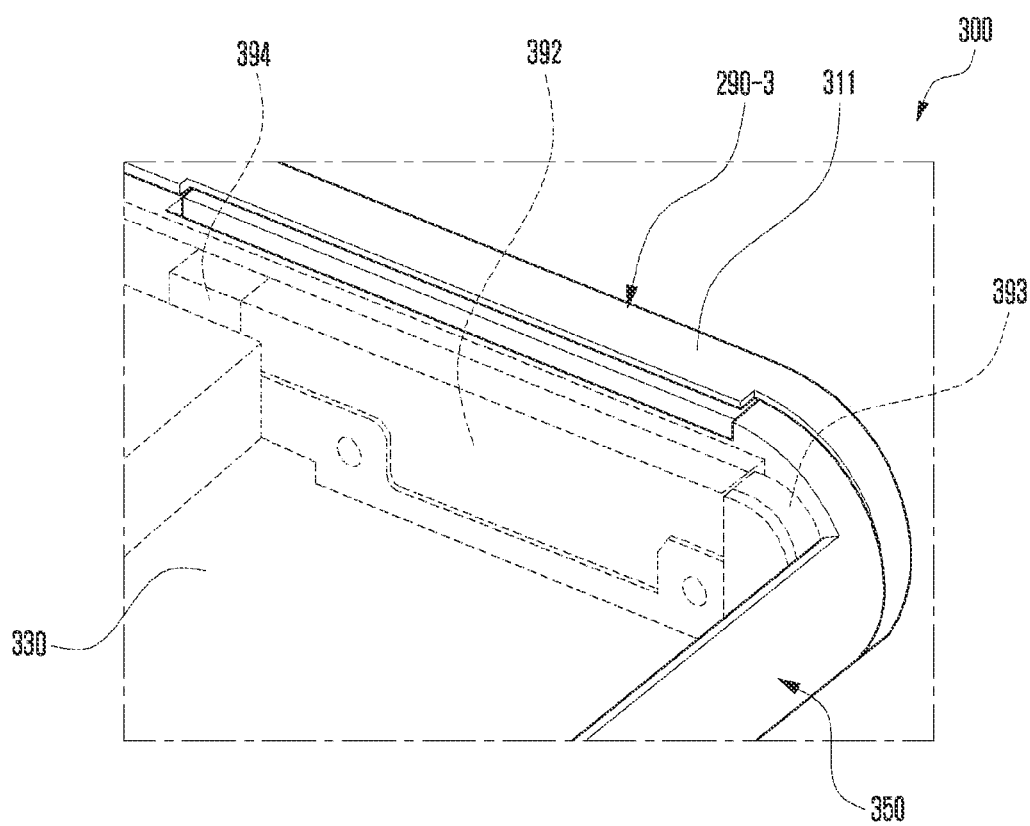
FIG. 13C is a partial perspective view of an electronic device including an example friction reducing structure according to various embodiments.

FIG. 13A is a diagram illustrating an electronic device including an example friction reducing structure according to various embodiments. FIG. 13B is a partial perspective view of an example cover member according to various embodiments. FIG. 13C is a partial perspective view of an electronic device including an example friction reducing structure according to various embodiments.

Referring to FIGS. 13A, 13B and 13C, an electronic device 300 (e.g., the electronic device 200 of FIG. 2A) may include a housing 310 (e.g., the housing 210 of FIG. 2A), and a slide structure 350 (e.g., the slide structure 250 of FIG. 2A) disposed to be movable from the housing 310 by a predetermined reciprocating distance in the direction (direction ①). According to an embodiment, the housing may include a first side cover 311 (e.g., the second side cover 212 in FIG. 2A) disposed to guide at least a part of the slide structure; and a second side cover 312 (e.g., the first side cover 211 of FIG. 2A) disposed opposite to the first side cover 311. According to an embodiment, the slide structure 350 may perform a sliding operation in the first direction (direction ①) through a guide structure formed through the first side cover 311 and the second side cover 312.

According to various embodiments, the electronic device 300 may include a friction reducing structure 290-3 disposed between the first side cover 311 and the slide structure 350. Although not shown, the friction reducing structure 290-3 may also be disposed substantially identically between the second side cover 312 and the slide structure 350. According to an embodiment, the friction reducing structure 290-3 may include a first magnet 391 disposed on the inner side surface 3111 of the first side cover 311; a second magnet 392 disposed on the side surface 3511 of the slide structure 350 such that, in connection with the first magnet 391, identical polarities face each other along a third direction (direction ③) perpendicular to the first direction (direction ①); a third magnet 393 disposed on the side surface 3511 of the slide structure 350 such that, in connection with the first magnet 391, different polarities face each other in a slide-in state of the electronic device 300; and a fourth magnet 394 disposed on the side surface 3511 of the slide structure 350 such that, in connection with the first magnet 391, different polarities face each other in a slide-out state of the electronic device 300.

According to various embodiments, the arrangement structure of the magnets 391 and 393 arranged to have an attractive force between the first magnet 391 and the third magnet 393 may continuously maintain a slide-in state of the electronic device 300. According to an embodiment, the arrangement structure of the magnets 391 and 394 arranged to have an attractive force between the first magnet 391 and the fourth magnet 394 may continuously maintain a slide-out state of the electronic device 300. According to an embodiment, the arrangement structure of the magnets 391 and 392 arranged to have a repulsive force between the first magnet 391 and the second magnet 392 may reduce the frictional resistance between the inner side surface 3111 of the side cover 311 and the side surface 3511 of the slide structure 350 during the sliding operation of the electronic device 300, thereby allowing a smooth sliding operation. In various embodiments, the first magnet 391 may also include a plurality of magnets arranged at a predetermined interval. In various embodiments, the arrangement structure of the first magnet 391 and the arrangement structure of the second, third, and fourth magnets 392, 393 and 394 may also be interchanged with each other. For example, the first magnet 391 may be disposed on the side surface 3511 of the slide structure 350, and the second, third, and fourth magnets 392, 393, and 394 may be arranged on the inner side surface 3111 of the first side cover 311.

Figure 14A:
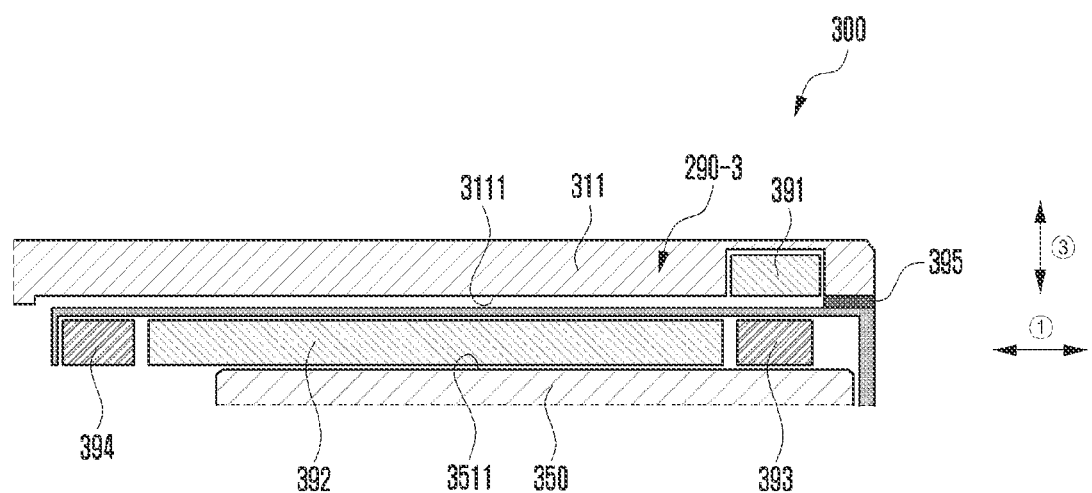
FIG. 14A is a diagram illustrating an example arrangement position of a friction reducing structure with respect to an operation of an electronic device according to various embodiments.
Figure 14B:
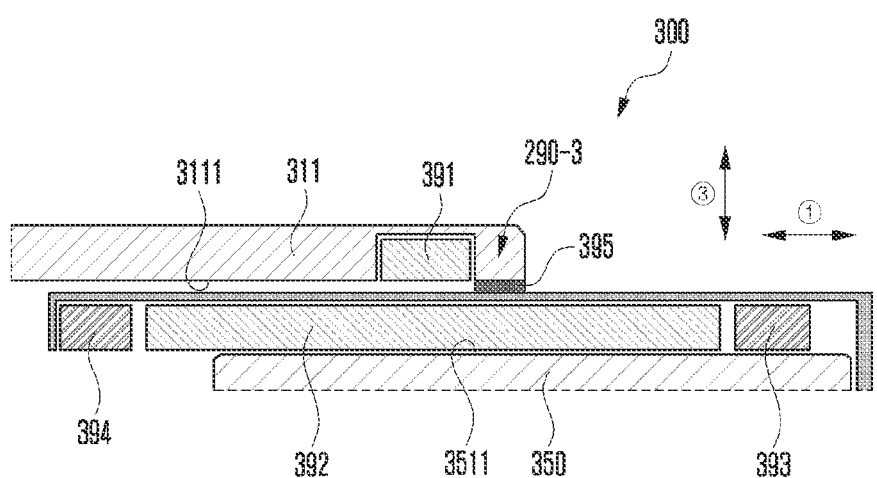
FIG. 14B is a diagram illustrating an example arrangement position of a friction reducing structure with respect to an operation of an electronic device according to various embodiments.
Figure 14C:
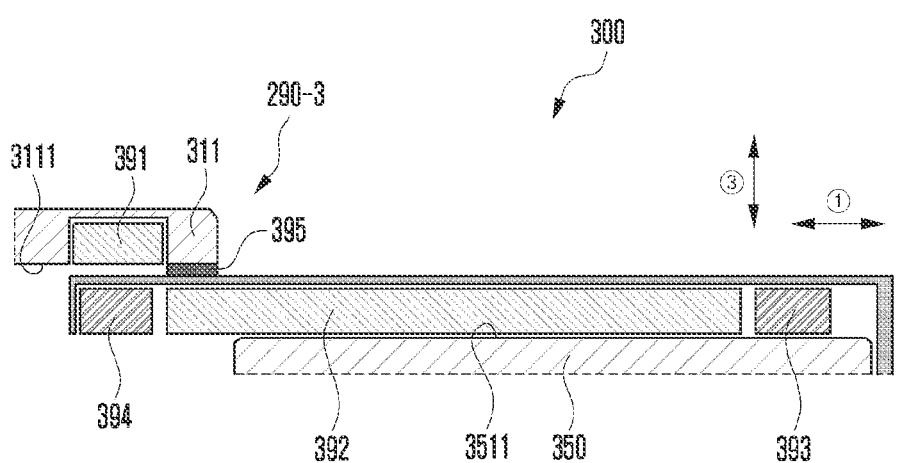
FIG. 14C is a diagram illustrating an example arrangement position of a friction reducing structure with respect to an operation of an electronic device according to various embodiments.

FIG. 14A is a diagram illustrating an example arrangement position of a friction reducing structure with respect to an operation of an electronic device according to various embodiments, FIG. 14B is a diagram illustrating an example arrangement position of a friction reducing structure with respect to an operation of an electronic device according to various embodiments, and FIG. 14C is a diagram illustrating an example arrangement position of a friction reducing structure with respect to an operation of an electronic device according to various embodiments.

Referring to FIG. 14A, when the electronic device 300 is in a slide-in state, the first magnet 391 may be positioned to face the third magnet 393. In this case, the first magnet 391 and the third magnet 393 may be arranged such that different polarities face each other, so that the slide structure 350 may be continuously retained in the slide-in state through an attractive force by the two magnets 391 and 393.

Referring to FIG. 14B, when the electronic device 300 is in an intermediate state for transitioning from a slide-in state to a slide-out state, the first magnet 391 may be positioned to face the second magnet 392. In this case, the first magnet 391 and the second magnet 392 may be arranged such that identical polarities face each other, so that the frictional resistance between the side surface 3511 of the slide structure 350 and the inner side surface 3111 of the first side cover 311 may be reduced through the repulsive force by the two magnets 391 and 392, thereby allowing a smooth sliding operation.

Referring to FIG. 14C, when the electronic device 300 is in a slide-out state, the first magnet 391 may be positioned to face the fourth magnet 394. In this case, the first magnet 391 and the fourth magnet 394 may be arranged such that different polarities face each other, so that the slide structure 350 may be continuously retained in the slide-out state through attractive force by the two magnets 391 and 394.

Figure 15:
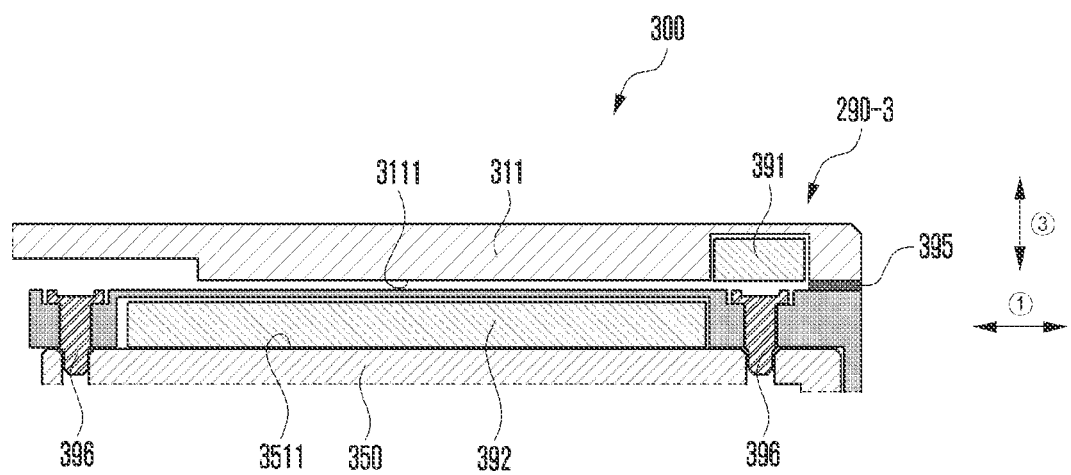
FIG. 15 is a partial cross-sectional view of an electronic device including an example friction reducing structure according to various embodiments.

FIG. 15 is a partial cross-sectional view of an electronic device including an example friction reducing structure according to various embodiments.

Referring to FIG. 15, the friction reducing structure 290-3 may include a screw 396 that replaces the third magnet 393 and the fourth magnet 394 in the friction reducing structure 290-3 of FIG. 14A. According to an embodiment, the screw 396 may be formed of a metal material that is affected by the magnetic force of the first magnet. According to an embodiment, the screw 396 may be disposed to couple one structure to another structure in the electronic device. Accordingly, the slide structure 350 may be continuously retained in the slide-in state and the slide-out state through the screw 396 that is affected by the magnetic force of the first magnet 391.

In the electronic device according to example embodiments, at least one magnet may be disposed on a guide structure between a housing and a slide structure, and a friction reducing structure for assisting the sliding operation a magnetic force (e.g., repulsive force) of the magnet may be provided on the guide structure to induce the reduction in a frictional force generated in the guide structure, thereby improving the sliding feeling and maintaining operational reliability even when the electronic device is used for a long period of time. In addition, lifting of a flexible display, occurring during a slide in/out operation, can be prevented and/or reduced using the magnetic force of the magnet.

According to various example embodiments, an electronic device (e.g., the electronic device 200 of FIG. 2A) may include: a housing including an inner space (e.g., the housing 210 of FIG. 2A); a slide structure including a reciprocating slide (e.g., the slide structure 250 of FIG. 2A) configured to be slidable from the housing by a predetermined reciprocating distance along a first direction (e.g., direction ① of FIG. 2B); a flexible display (e.g., the flexible display 230 of FIG. 2A) at least partially supported by the slide structure and received in the inner space to be at least partially invisible from the outside in a slide-in state; and a first friction reducing structure (e.g., the friction reducing structure 290 of FIG. 6A) disposed between the housing and the slide structure. The first friction reducing structure may include: a guide slit (e.g., the guide slit 2111 of FIG. 6A) disposed in a direction parallel to the first direction and having a predetermined length in the housing; a guide protrusion (e.g., the guide protrusion 253 of FIG. 6A) configured to be guided by the guide slit in the slide structure; at least one first magnet (e.g., the first magnet 291 of FIG. 6A) disposed on the guide slit; and at least one second magnet (e.g., the second magnet 292 of FIG. 6A) disposed on the guide protrusion at a position affected by the magnetic force of the first magnet. The at least one first magnet and the at least one second magnet may be arranged having identical polarities at least partially facing face each other along a second direction (e.g., direction 2 of FIG. 6A) perpendicular to the first direction.

According to various example embodiments, the at least one first magnet may be disposed on each of an upper inner surface and a lower inner surface of the guide slit, with the guide protrusion and the at least one second magnet interposed therebetween.

According to various example embodiments, the at least one first magnet may have a length substantially equal to the length of the guide slit.

According to various example embodiments, the at least one first magnet may include a plurality of magnets arranged at predetermined intervals.

According to various example embodiments, the at least one first magnet may be disposed to substantially surround the guide protrusion and the at least one second magnet.

According to various example embodiments, the electronic device may further include a shielding member comprising a shielding material disposed between the guide slit and the at least one first magnet.

According to various example embodiments, the electronic device may further include a bendable support connected to the slide structure to be disposed to support at least a part of the flexible display. The bendable support may be received in the inner space in the slide-in state and may be configured to slide out from the inner space to form a plane substantially the same as that of the slide structure.

According to various example embodiments, the electronic device may include a second friction reducing structure disposed between the housing and the bendable member, the second friction reducing structure including at least one third magnet disposed in the housing, and at least one fourth magnet disposed on the bendable support. The at least one third magnet and the at least one fourth magnet may be arranged having identical polarities at least partially facing each other, along the second direction.

According to various example embodiments, the housing may include a cover portion at least partially overlapping the bendable support and the flexible display when the flexible display is viewed from above. The at least one third magnet and the at least one fourth magnet may be arranged between the cover portion and the bendable support.

According to various example embodiments, at least a part of the flexible display may be disposed between the at least one third magnet and the at least one fourth magnet.

According to various example embodiments, the electronic device may further include a sweeper disposed between the at least one third magnet and the flexible display.

According to various example embodiments, the at least one fourth magnet may be mounted in a recess positioned lower than an outer surface supporting the flexible display provided on the bendable support, and the at least one fourth magnet and the flexible display may form the same planes.

According to various example embodiments, the electronic device may further include a sweeper disposed between the cover part and the flexible display.

According to various example embodiments, the electronic device may further include a shielding member comprising a shielding material disposed between the cover portion and the at least one third magnet, and/or between the bendable support and the at least one fourth magnet.

According to various example embodiments, the electronic device may include a third friction reducing structure disposed in the inner space between the bendable support and the housing, the third friction reducing structure including at least one fifth magnet disposed in the inner space of the housing, and at least one sixth magnet provided between the flexible display and the bendable support. In the slide-in state, the at least one fifth magnet and the at least one sixth magnet may have identical polarities at least partially facing each other along the second direction.

According to various example embodiments, the flexible display may include a display panel, and the at least one sixth magnet may include at least one magnetized metal sheet at least partially attached to a rear surface of the display panel.

According to various example embodiments, the electronic device may further include a shielding member comprising a shielding material disposed between the at least one fifth magnet and the housing.

According to various example embodiments, the electronic device may include a seventh magnet disposed in the guide slit facing the at least one second magnet in the slide-in state, and an eighth magnet disposed in the guide slit facing the at least one second magnet in the slide-out state. The seventh magnet and the eighth magnet may be arranged, in connection with the at least one first magnet, to have different polarities at least partially facing each other.

According to various example embodiments, the bendable support may include a plurality of unit multi-bars coupled to be rotatable with respect to each other, and the at least one fourth magnet may be disposed on each of the plurality of unit multi-bars.

According to various example embodiments, the bendable support may include a plurality of unit multi-bars coupled to be rotatable with respect to each other, and the at least one fourth magnet may be disposed on unit multi-bars selected from the plurality of unit multi-bars.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure including the appended claims and their equivalents.

What is claimed is:

1. An electronic device comprising:
   a first housing, and an inner space at least partially defined by the first housing;
   a second housing slidably coupled to the first housing along a first direction;
   a flexible display at least partially supported by the second housing and configured to be received in the inner space to be at least partially invisible from the outside in a slide-in state of the electronic device;
   a bendable member, comprising bendable material, connected to the second housing to support at least a part of the flexible display; and
   a first friction reducing structure disposed between at least the first housing and the bendable member,
   wherein the first friction reducing structure comprises:
      at least one first magnet disposed in the first housing; and
      at least one second magnet disposed on the bendable member,
      wherein the at least one first magnet and the at least one second magnet are arranged to have identical polarities at least partially facing each other along a second direction perpendicular to a surface of the flexible display.

2. The electronic device of claim 1, wherein the first housing comprises a cover portion at least partially overlapping the bendable member and the flexible display when the flexible display is viewed from above, and
   wherein the at least one first magnet and the at least one second magnet are disposed between at least the cover portion and the bendable member.

3. The electronic device of claim 1, further comprising a sweeper disposed between at least the at least one first magnet and the flexible display and configured to remove foreign substances attached to an outer surface of the flexible display.

4. The electronic device of claim 3, wherein the first housing comprises a cover portion at least partially overlapping the bendable member and the flexible display when the flexible display is viewed from above, and
   wherein the sweeper is disposed in the cover portion of the first housing.

5. The electronic device of claim 1, wherein the at least one second magnet is mounted in a recess positioned lower than an outer surface supporting the flexible display formed on the bendable member, and
   wherein the at least one second magnet and the flexible display form identical planes.

6. The electronic device of claim 1, further comprising a first shielding member comprising shielding material disposed between the first housing and the at least one first magnet, and/or between the bendable member and the at least one second magnet.

7. The electronic device of claim 1, wherein the bendable member includes a plurality of multi-bars arranged to be rotatable with respect to each other so as to have a predetermined curvature, and
   wherein the at least one second magnet is disposed on each of the plurality of multi-bars to face the at least one first magnet.

8. The electronic device of claim 1, wherein the bendable member includes a plurality of multi-bars arranged to be rotatable with respect to each other so as to have a predetermined curvature, and wherein the second magnet is disposed on each of the designated multi-bars among the plurality of multi-bars.

9. The electronic device of claim 1, further comprising a second friction reducing structure disposed between at least the first housing and the second housing, wherein the second friction reducing structure comprises:
a guide slit disposed in a direction parallel to the first direction and having a predetermined length in the first housing;
a guide protrusion configured to be guided by the guide slit in the second housing;
at least one third magnet disposed on the guide slit; and
at least one fourth magnet disposed on the guide protrusion at a position affected by a magnetic force of the first magnet,
wherein the at least one third magnet and the at least one fourth magnet are arranged to have identical polarities at least partially facing each other along the second direction.

10. The electronic device of claim 9, wherein the at least one third magnet has a length substantially equal to a length of the guide slit.

11. The electronic device of claim 9, wherein the at least one third magnet comprises a plurality of magnets arranged at predetermined intervals on the guide slit.

12. The electronic device of claim 9, wherein the at least one third magnet is disposed to substantially surround the guide protrusion and the at least one fourth magnet.

13. The electronic device of claim 9, further comprising a second shielding member disposed between the guide slit and the at least one third magnet.

14. The electronic device of claim 9, further comprising:
at least one fifth magnet disposed in the guide slit facing the at least one fourth magnet in the slide-in state of the electronic device; and
at least one sixth magnet disposed in the guide slit facing the at least one fourth magnet in a slide-out state of the electronic device,
wherein the at least one fifth magnet and the sixth magnet are arranged, in connection with the at least one third magnet, to have different polarities at least partially facing each other.

15. An electronic device comprising:
a first housing including an inner space;
a second housing slidably coupled to the first housing along a first direction;
a flexible display at least partially supported by the second housing and configured to be received in the inner space to be at least partially invisible from the outside in a slide-in state of the electronic device; and
a friction reducing structure disposed between at least the first housing and the flexible display,
wherein the friction reducing structure comprises:
at least one first magnet disposed in the first housing; and
at least one second magnet disposed on the rear surface of the flexible display,
wherein in the slide-in state of the electronic device, the at least one first magnet and the at least one second magnet are arranged to have identical polarities at least partially facing each other along the second direction perpendicular to a surface of the flexible display.

16. The electronic device of claim 15, further comprising a bendable member, comprising multi-bar, connected to the second housing to support the rear surface of the flexible display.

17. The electronic device of claim 16, wherein the at least one second magnet is disposed between the flexible display and the bendable member.

18. The electronic device of claim 16, wherein the flexible display comprises a display panel, and wherein the at least one second magnet comprises at least one magnetized metal sheet at least partially attached to the rear surface of the display panel.

19. The electronic device of claim 16, further comprising a shielding member, comprising a shielding material, disposed between the at least one first magnet and the first housing.

20. The electronic device of claim 16, wherein the bendable member includes a plurality of multi-bars arranged to be rotatable with respect to each other so as to have a predetermined curvature, wherein the bendable member comprises a plurality of unit multi-bars coupled to be rotatable with respect to each other.

\* \* \* \* \*